United States Patent
Sauer et al.

(10) Patent No.: US 7,848,654 B2
(45) Date of Patent: Dec. 7, 2010

(54) RADIO-OVER-FIBER (ROF) WIRELESS PICOCELLULAR SYSTEM WITH COMBINED PICOCELLS

(75) Inventors: Michael Sauer, Corning, NY (US); Richard S. Vodhanel, Red Bank, NJ (US); Martyn N. Easton, Lenoir, NC (US); Aravind Chamarti, Painted Post, NY (US); Jack Winters, Middletown, NJ (US)

(73) Assignee: Corning Cable Systems LLC, Hickory, NC (US)

( * ) Notice: Subject to any disclaimer, the term of this patent is extended or adjusted under 35 U.S.C. 154(b) by 889 days.

(21) Appl. No.: 11/529,174

(22) Filed: Sep. 28, 2006

(65) Prior Publication Data

US 2008/0080863 A1    Apr. 3, 2008

(51) Int. Cl.
*H04B 10/00* (2006.01)
(52) U.S. Cl. .............. 398/115; 398/59; 398/60; 398/68; 398/69; 398/72; 398/73; 398/83; 398/70; 370/352; 370/389; 370/392; 455/422; 455/422.1
(58) Field of Classification Search .......... 398/115, 398/116, 117, 118, 43, 79, 41, 141, 66, 67, 398/68, 69, 70, 71, 72, 42, 59, 60, 73, 74, 398/75, 76, 77, 99, 98, 100, 103, 128, 130, 398/135, 153, 167.5, 83; 370/328, 329, 339, 370/338, 310, 277, 352, 389, 392, 465; 455/422, 455/422.1
See application file for complete search history.

(56) References Cited

U.S. PATENT DOCUMENTS 4,365,865 A    12/1982    Stiles
4,867,527 A    9/1989    Dotti et al.
4,889,977 A    12/1989    Haydon (Continued)

FOREIGN PATENT DOCUMENTS

AU    645192 B    10/1992

(Continued)

OTHER PUBLICATIONS

International Search Report, Patent Cooperation Treaty, International Application No. PCT/US07/21041, 1 page.

(Continued)

*Primary Examiner*—Hanh Phan
(74) *Attorney, Agent, or Firm*—C. Keith Montgomery

(57) ABSTRACT

A radio-over-fiber (RoF) wireless picocellular system adapted to form an array of substantially non-overlapping individual picocells by operating adjacent picocells at different frequencies is operated to form one or more combined picocells. The combined picocells are formed from two or more neighboring picocells by the central head-end station operating neighboring picocells at a common frequency. Communication between the central head-end station and a client device residing within a combined picocell is enhanced by the availability of two or more transponder antenna systems. Thus, enhanced communication techniques such as antenna diversity, phased-array antenna networks and multiple-input/multiple-output (MIMO) methods can be implemented to provide the system with enhanced performance capability. These techniques are preferably implemented at the central head-end station to avoid having to make substantial changes to the wireless picocellular system infrastructure.

20 Claims, 13 Drawing Sheets

U.S. PATENT DOCUMENTS

| | | | |
|---|---|---|---|
| 4,896,939 A | 1/1990 | O'Brien | |
| 4,916,460 A | 4/1990 | Powell | 343/853 |
| 5,039,195 A | 8/1991 | Jenkins et al. | |
| 5,042,086 A | 8/1991 | Cole et al. | |
| 5,125,060 A | 6/1992 | Edmundson | |
| 5,189,718 A | 2/1993 | Barrett et al. | |
| 5,189,719 A | 2/1993 | Coleman et al. | |
| 5,210,812 A | 5/1993 | Nilsson et al. | |
| 5,260,957 A | 11/1993 | Hakimi et al. | |
| 5,263,108 A | 11/1993 | Kurokawa et al. | |
| 5,267,122 A | 11/1993 | Glover et al. | |
| 5,268,971 A | 12/1993 | Nilsson et al. | |
| 5,299,947 A | 4/1994 | Barnard | |
| 5,301,056 A | 4/1994 | O'Neill | 359/145 |
| 5,339,058 A | 8/1994 | Lique | |
| 5,339,184 A | 8/1994 | Tang | 359/124 |
| 5,377,035 A | 12/1994 | Wang et al. | |
| 5,379,455 A | 1/1995 | Koschek | |
| 5,400,391 A | 3/1995 | Emura et al. | 379/59 |
| 5,424,864 A | 6/1995 | Emura | 359/173 |
| 5,444,564 A | 8/1995 | Newberg | 359/187 |
| 5,457,557 A | 10/1995 | Zarem et al. | 359/121 |
| 5,459,727 A | 10/1995 | Vannucci | |
| 5,469,523 A | 11/1995 | Blew et al. | |
| 5,543,000 A | 8/1996 | Lique | |
| 5,546,443 A | 8/1996 | Raith | |
| 5,557,698 A | 9/1996 | Gareis et al. | |
| 5,574,815 A | 11/1996 | Kneeland | |
| 5,598,288 A | 1/1997 | Collar | |
| 5,615,034 A | 3/1997 | Hori | |
| 5,627,879 A | 5/1997 | Russell et al. | 379/59 |
| 5,640,678 A | 6/1997 | Ishikawa et al. | 455/33.2 |
| 5,644,622 A | 7/1997 | Russell et al. | 455/422 |
| 5,648,961 A | 7/1997 | Ebihara | 370/282 |
| 5,651,081 A | 7/1997 | Blew et al. | |
| 5,668,562 A | 9/1997 | Cutrer et al. | |
| 5,677,974 A | 10/1997 | Elms et al. | |
| 5,682,256 A | 10/1997 | Motley et al. | 359/117 |
| 5,703,602 A | 12/1997 | Casebolt | |
| 5,790,606 A | 8/1998 | Dent | |
| 5,802,473 A | 9/1998 | Rutledge et al. | |
| 5,805,983 A | 9/1998 | Naidu et al. | |
| 5,812,296 A | 9/1998 | Tarusawa et al. | |
| 5,818,619 A | 10/1998 | Medved et al. | |
| 5,821,510 A | 10/1998 | Cohen et al. | |
| 5,825,651 A | 10/1998 | Gupta et al. | |
| 5,838,474 A | 11/1998 | Stilling | |
| 5,854,986 A | 12/1998 | Dorren et al. | 455/562 |
| 5,867,485 A | 2/1999 | Chambers et al. | 370/281 |
| 5,881,200 A | 3/1999 | Burt | |
| 5,883,882 A | 3/1999 | Schwartz | |
| 5,896,568 A | 4/1999 | Tseng et al. | |
| 5,903,834 A | 5/1999 | Wallstedt et al. | |
| 5,910,776 A | 6/1999 | Black | |
| 5,913,003 A | 6/1999 | Arroyo et al. | |
| 5,917,636 A | 6/1999 | Wake et al. | |
| 5,930,682 A | 7/1999 | Schwartz et al. | |
| 5,936,754 A | 8/1999 | Ariyavisitakul et al. | 359/145 |
| 5,943,372 A | 8/1999 | Gans et al. | |
| 5,946,622 A | 8/1999 | Bojeryd | 455/444 |
| 5,949,564 A | 9/1999 | Wake | |
| 5,959,531 A | 9/1999 | Gallagher, III et al. | |
| 5,960,344 A | 9/1999 | Mahany | |
| 5,969,837 A | 10/1999 | Farber et al. | 359/132 |
| 5,983,070 A | 11/1999 | Georges et al. | |
| 5,987,303 A | 11/1999 | Dutta et al. | |
| 6,005,884 A | 12/1999 | Cook et al. | 375/202 |
| 6,006,105 A | 12/1999 | Rostoker et al. | |
| 6,014,546 A | 1/2000 | Georges et al. | |
| 6,016,426 A | 1/2000 | Bodell | 455/422 |
| 6,023,625 A | 2/2000 | Myers, Jr. | |
| 6,088,381 A | 7/2000 | Myers, Jr. | |
| 6,127,917 A | 10/2000 | Tuttle | 340/10.1 |
| 6,128,470 A | 10/2000 | Naidu et al. | 455/16 |
| 6,148,041 A | 11/2000 | Dent | |
| 6,150,921 A | 11/2000 | Werb et al. | 340/10.1 |
| 6,157,810 A | 12/2000 | Georges et al. | |
| 6,232,870 B1 | 5/2001 | Garber et al. | |
| 6,236,789 B1 | 5/2001 | Fitz | |
| 6,240,274 B1 | 5/2001 | Izadpanah | |
| 6,268,946 B1 | 7/2001 | Larkin et al. | 359/173 |
| 6,292,673 B1 | 9/2001 | Maeda et al. | 455/522 |
| 6,314,163 B1 | 11/2001 | Acampora | |
| 6,323,980 B1 | 11/2001 | Bloom | |
| 6,324,391 B1 | 11/2001 | Bodell | 455/403 |
| 6,337,754 B1 | 1/2002 | Imajo | 359/174 |
| 6,353,406 B1 | 3/2002 | Lanzl et al. | 342/118 |
| 6,353,600 B1 | 3/2002 | Schwartz et al. | |
| 6,374,078 B1 | 4/2002 | Williams et al. | |
| 6,374,124 B1 | 4/2002 | Slabinski | 455/562 |
| 6,405,018 B1 | 6/2002 | Reudink et al. | 455/20 |
| 6,405,058 B2 | 6/2002 | Bobier | 455/562 |
| 6,405,308 B1 | 6/2002 | Gupta et al. | |
| 6,438,301 B1 | 8/2002 | Johnson et al. | |
| 6,438,371 B1 | 8/2002 | Fujise et al. | 455/422 |
| 6,477,154 B1 | 11/2002 | Cheong et al. | 370/328 |
| 6,486,907 B1 | 11/2002 | Farber et al. | |
| 6,501,965 B1 | 12/2002 | Lucidarme | |
| 6,504,636 B1 | 1/2003 | Seto et al. | |
| 6,512,478 B1 | 1/2003 | Chien | |
| 6,519,395 B1 | 2/2003 | Bevan | |
| 6,525,855 B1 | 2/2003 | Westbrook et al. | |
| 6,556,551 B1 | 4/2003 | Schwartz | |
| 6,577,794 B1 | 6/2003 | Currie et al. | |
| 6,577,801 B2 | 6/2003 | Broderick et al. | |
| 6,580,905 B1 | 6/2003 | Naidu et al. | |
| 6,580,918 B1 | 6/2003 | Leickel et al. | |
| 6,583,763 B2 | 6/2003 | Judd | |
| 6,594,496 B2 | 7/2003 | Schwartz | |
| 6,597,325 B2 | 7/2003 | Judd et al. | |
| 6,606,430 B2 | 8/2003 | Bartur et al. | |
| 6,634,811 B1 | 10/2003 | Gertel et al. | |
| 6,636,747 B2 | 10/2003 | Harada et al. | |
| 6,640,103 B1 | 10/2003 | Inman et al. | |
| 6,643,437 B1 | 11/2003 | Park | |
| 6,652,158 B2 | 11/2003 | Bartur et al. | |
| 6,654,616 B1 | 11/2003 | Pope, Jr. et al. | |
| 6,675,294 B1 | 1/2004 | Gupta et al. | |
| 6,687,437 B1 | 2/2004 | Starnes et al. | |
| 6,690,328 B2 | 2/2004 | Judd | |
| 6,704,545 B1 | 3/2004 | Wala | |
| 6,710,366 B1 | 3/2004 | Lee et al. | |
| 6,731,880 B2 | 5/2004 | Westbrook et al. | |
| 6,758,913 B1 | 7/2004 | Tunney et al. | |
| 6,771,862 B2 | 8/2004 | Karnik et al. | |
| 6,771,933 B1 | 8/2004 | Eng et al. | |
| 6,784,802 B1 | 8/2004 | Stanescu | |
| 6,785,558 B1 | 8/2004 | Stratford et al. | |
| 6,788,666 B1 | 9/2004 | Linebarger et al. | 370/338 |
| 6,801,767 B1 | 10/2004 | Schwartz et al. | 455/426.2 |
| 6,807,374 B1 | 10/2004 | Imajo et al. | 398/115 |
| 6,812,824 B1 | 11/2004 | Goldinger et al. | |
| 6,812,905 B2 | 11/2004 | Thomas et al. | |
| 6,826,337 B2 | 11/2004 | Linnell | |
| 6,847,856 B1 | 1/2005 | Bohannon | |
| 6,865,390 B2 | 3/2005 | Goss et al. | 455/445 |
| 6,873,823 B2 | 3/2005 | Hasarchi et al. | |
| 6,879,290 B1 | 4/2005 | Toutain et al. | |
| 6,883,710 B2 | 4/2005 | Chung | 235/385 |
| 6,885,846 B1 | 4/2005 | Panasik et al. | 455/41.2 |
| 6,889,060 B2 | 5/2005 | Fernando et al. | |
| 6,909,399 B1 | 6/2005 | Zegelin et al. | 342/463 |
| 6,915,058 B2 | 7/2005 | Pons | |
| 6,920,330 B2 | 7/2005 | Caronni et al. | 455/456.1 |

| | | | | | |
|---|---|---|---|---|---|
| 6,924,997 B2 | 8/2005 | Chen et al. | 2002/0181668 A1 | 12/2002 | Masoian et al. ............ 379/56.3 |
| 6,930,987 B1 | 8/2005 | Fukuda et al. | 2002/0190845 A1 | 12/2002 | Moore ...................... 340/10.3 |
| 6,931,183 B2 | 8/2005 | Panak et al. .................. 385/101 | 2003/0007214 A1* | 1/2003 | Aburakawa et al. ......... 359/145 |
| 6,933,849 B2 | 8/2005 | Sawyer .................... 340/572.4 | 2003/0016418 A1 | 1/2003 | Westbrook et al. |
| 6,963,289 B2 | 11/2005 | Aljadeff et al. | 2003/0045284 A1 | 3/2003 | Copley et al. ............... 455/426 |
| 6,963,552 B2 | 11/2005 | Sabat, Jr. et al. | 2003/0078074 A1 | 4/2003 | Sesay et al. |
| 6,965,718 B2 | 11/2005 | Koertel ....................... 385/101 | 2003/0141962 A1 | 7/2003 | Barink .................... 340/10.42 |
| 6,968,107 B2 | 11/2005 | Belardi et al. | 2003/0161637 A1 | 8/2003 | Yamamoto et al. |
| 6,970,652 B2 | 11/2005 | Zhang et al. | 2003/0165287 A1 | 9/2003 | Krill et al. ..................... 385/24 |
| 6,973,243 B2 | 12/2005 | Koyasu et al. | 2003/0174099 A1 | 9/2003 | Bauer et al. |
| 6,974,262 B1 | 12/2005 | Rickenbach | 2003/0209601 A1 | 11/2003 | Chung |
| 7,006,465 B2 | 2/2006 | Toshimitsu et al. | 2004/0001719 A1 | 1/2004 | Sasaki |
| 7,013,087 B2* | 3/2006 | Suzuki et al. ................ 398/115 | 2004/0008114 A1 | 1/2004 | Sawyer |
| 7,020,473 B2 | 3/2006 | Splett ...................... 455/456.1 | 2004/0017785 A1 | 1/2004 | Zelst .......................... 370/328 |
| 7,035,512 B2 | 4/2006 | Van Bijsterveld | 2004/0041714 A1 | 3/2004 | Forster |
| 7,039,399 B2 | 5/2006 | Fischer .................... 455/422.1 | 2004/0043764 A1 | 3/2004 | Bigham et al. |
| 7,047,028 B2 | 5/2006 | Cagenius | 2004/0047313 A1 | 3/2004 | Rumpf et al. ............... 370/335 |
| 7,053,838 B2 | 5/2006 | Judd | 2004/0078151 A1 | 4/2004 | Aljadeff et al. |
| 7,054,513 B2 | 5/2006 | Herz et al. | 2004/0100930 A1 | 5/2004 | Shapira et al. |
| 7,072,586 B2 | 7/2006 | Aburakawa et al. ......... 398/115 | 2004/0126068 A1 | 7/2004 | Van Bijsterveld |
| 7,082,320 B2 | 7/2006 | Kattukaran et al. | 2004/0149736 A1 | 8/2004 | Clothier |
| 7,084,769 B2 | 8/2006 | Bauer et al. .............. 340/572.7 | 2004/0151503 A1 | 8/2004 | Kashima et al. |
| 7,093,985 B2 | 8/2006 | Lord et al. | 2004/0157623 A1 | 8/2004 | Splett |
| 7,106,931 B2 | 9/2006 | Sutehall et al. | 2004/0162115 A1 | 8/2004 | Smith et al. |
| 7,114,859 B1 | 10/2006 | Tuohimaa et al. | 2004/0162116 A1 | 8/2004 | Han et al. |
| 7,127,176 B2 | 10/2006 | Sasaki | 2004/0175173 A1 | 9/2004 | Deas |
| 7,142,503 B1 | 11/2006 | Grant et al. | 2004/0202257 A1 | 10/2004 | Mehta et al. |
| 7,160,032 B2 | 1/2007 | Nagashima et al. | 2004/0203704 A1 | 10/2004 | Ommodt et al. .......... 455/422.1 |
| 7,200,305 B2 | 4/2007 | Dion et al. | 2004/0203846 A1 | 10/2004 | Caronni et al. |
| 7,200,391 B2 | 4/2007 | Chung et al. | 2004/0204109 A1 | 10/2004 | Hoppenstein ............. 455/562.1 |
| 7,228,072 B2 | 6/2007 | Mickelsson et al. | 2004/0208526 A1 | 10/2004 | Mibu |
| 7,263,293 B2 | 8/2007 | Ommodt et al. | 2004/0218873 A1 | 11/2004 | Nagashima et al. |
| 7,269,311 B2 | 9/2007 | Kim et al. | 2004/0233877 A1 | 11/2004 | Lee et al. .................... 370/338 |
| 7,286,843 B2 | 10/2007 | Scheck | 2004/0258105 A1 | 12/2004 | Spathas et al. .............. 370/539 |
| 7,286,854 B2 | 10/2007 | Ferrato et al. | 2005/0052287 A1 | 3/2005 | Whitesmith et al. |
| 7,295,119 B2 | 11/2007 | Rappaport et al. | 2005/0058451 A1 | 3/2005 | Ross ........................... 398/70 |
| 7,310,430 B1 | 12/2007 | Mallya et al. | 2005/0068179 A1 | 3/2005 | Roesner |
| 7,313,415 B2 | 12/2007 | Wake et al. | 2005/0076982 A1 | 4/2005 | Metcalf et al. |
| 7,324,730 B2 | 1/2008 | Varkey et al. | 2005/0078006 A1 | 4/2005 | Hutchins et al. |
| 7,343,164 B2 | 3/2008 | Kallstenius | 2005/0093679 A1 | 5/2005 | Zai et al. |
| 7,349,633 B2 | 3/2008 | Lee et al. | 2005/0099343 A1 | 5/2005 | Asrani et al. |
| 7,359,408 B2 | 4/2008 | Kim | 2005/0116821 A1 | 6/2005 | Wilsey et al. |
| 7,366,150 B2 | 4/2008 | Lee et al. | 2005/0141545 A1 | 6/2005 | Fein et al. |
| 7,379,669 B2 | 5/2008 | Kim | 2005/0143077 A1 | 6/2005 | Charbonneau |
| 7,392,029 B2 | 6/2008 | Pronkine | 2005/0148306 A1 | 7/2005 | Hiddink |
| 7,394,883 B2 | 7/2008 | Funakubo et al. | 2005/0159108 A1 | 7/2005 | Fletcher et al. ............. 455/63.4 |
| 7,403,156 B2 | 7/2008 | Coppi et al. | 2005/0174236 A1 | 8/2005 | Brookner |
| 7,409,159 B2 | 8/2008 | Izadpanah | 2005/0201761 A1 | 9/2005 | Bartur et al. |
| 7,424,228 B1 | 9/2008 | Williams et al. | 2005/0219050 A1 | 10/2005 | Martin |
| 7,444,051 B2 | 10/2008 | Tatat et al. | 2005/0224585 A1 | 10/2005 | Durrant et al. |
| 7,450,853 B2 | 11/2008 | Kim et al. | 2005/0226625 A1 | 10/2005 | Wake et al. ................. 398/115 |
| 7,450,854 B2 | 11/2008 | Lee et al. | 2005/0232636 A1 | 10/2005 | Durrant et al. |
| 7,460,829 B2 | 12/2008 | Utsumi et al. | 2005/0242188 A1 | 11/2005 | Vesuna |
| 7,460,831 B2 | 12/2008 | Hasarchi | 2005/0252971 A1 | 11/2005 | Howarth et al. |
| 7,466,925 B2 | 12/2008 | Iannelli | 2005/0259930 A1 | 11/2005 | Elkins, II et al. |
| 7,469,105 B2 | 12/2008 | Wake et al. | 2005/0266797 A1 | 12/2005 | Utsumi et al. ................... 455/7 |
| 7,477,597 B2 | 1/2009 | Segel | 2005/0266854 A1 | 12/2005 | Niiho et al. ................. 455/445 |
| 7,483,504 B2 | 1/2009 | Shapira et al. | 2005/0271396 A1 | 12/2005 | Iannelli ...................... 398/193 |
| 7,496,070 B2 | 2/2009 | Vesuna | 2006/0002326 A1 | 1/2006 | Vesuna |
| 7,496,384 B2 | 2/2009 | Seto et al. | 2006/0014548 A1 | 1/2006 | Bolin et al. |
| 7,522,252 B2 | 4/2009 | Fein et al. | 2006/0017633 A1 | 1/2006 | Pronkine .................... 343/729 |
| 7,548,695 B2 | 6/2009 | Wake | 2006/0045054 A1 | 3/2006 | Utsumi et al. |
| 7,590,354 B2* | 9/2009 | Sauer et al. ................. 398/115 | 2006/0062579 A1 | 3/2006 | Kim et al. |
| 2002/0003645 A1 | 1/2002 | Kim et al. | 2006/0094470 A1 | 5/2006 | Wake et al. ............... 455/562.1 |
| 2002/0012495 A1* | 1/2002 | Sasai et al. .................... 385/24 | 2006/0104643 A1 | 5/2006 | Lee et al. |
| 2002/0048071 A1 | 4/2002 | Suzuki et al. | 2006/0159388 A1 | 7/2006 | Kawase et al. |
| 2002/0075906 A1 | 6/2002 | Cole et al. .................. 370/535 | 2006/0182446 A1 | 8/2006 | Kim et al. ..................... 398/72 |
| 2002/0092347 A1 | 7/2002 | Niekirk et al. | 2006/0182449 A1 | 8/2006 | Iannelli et al. .............. 398/186 |
| 2002/0111149 A1 | 8/2002 | Shoki | 2006/0189354 A1 | 8/2006 | Lee et al. .................... 455/561 |
| 2002/0111192 A1 | 8/2002 | Thomas et al. | 2006/0233506 A1 | 10/2006 | Noonan et al. |
| 2002/0114038 A1 | 8/2002 | Arnon et al. | 2006/0239630 A1 | 10/2006 | Hase et al. |
| 2002/0126967 A1 | 9/2002 | Panak et al. | 2007/0009266 A1 | 1/2007 | Bothwell et al. ............ 398/161 |
| 2002/0130778 A1 | 9/2002 | Nicholson | 2007/0058978 A1 | 3/2007 | Lee et al. |

| | | | | | | |
|---|---|---|---|---|---|---|
| 2007/0093273 A1 | 4/2007 | Cai | | JP | 09-200840 | 7/1997 |
| 2007/0149250 A1 | 6/2007 | Crozzoli et al. | | JP | 1168675 A | 3/1999 |
| 2007/0166042 A1 | 7/2007 | Seeds et al. ............ 398/142 | | JP | 2000-152300 | 5/2000 |
| 2007/0248358 A1 | 10/2007 | Sauer | | JP | 2000-341744 | 8/2000 |
| 2007/0253714 A1 | 11/2007 | Seeds et al. ............ 398/115 | | JP | 2002-264617 | 9/2002 |
| 2007/0274279 A1 | 11/2007 | Wood et al. | | JP | 2003-148653 | 5/2003 |
| 2008/0007453 A1 | 1/2008 | Vassilakis et al. | | JP | 2003-172827 | 6/2003 |
| 2008/0013909 A1 | 1/2008 | Kostet et al. | | JP | 2004-172734 | 6/2004 |
| 2008/0013956 A1 | 1/2008 | Ware et al. | | JP | 2004-245963 | 9/2004 |
| 2008/0013957 A1 | 1/2008 | Akers et al. | | JP | 2004-247090 | 9/2004 |
| 2008/0014948 A1 | 1/2008 | Scheinert | | JP | 2004-264901 | 9/2004 |
| 2008/0026765 A1 | 1/2008 | Charbonneau | | JP | 2004-265624 | 9/2004 |
| 2008/0031628 A1 | 2/2008 | Dragas et al. | | JP | 2004-317737 | 11/2004 |
| 2008/0056167 A1 | 3/2008 | Kim et al. | | JP | 2004-349184 | 12/2004 |
| 2008/0058018 A1 | 3/2008 | Scheinert | | JP | 2005-018175 | 1/2005 |
| 2008/0119198 A1 | 5/2008 | Hettstedt et al. | | JP | 2005-087135 | 4/2005 |
| 2008/0124086 A1 | 5/2008 | Matthews | | JP | 2005-134125 | 5/2005 |
| 2008/0124087 A1 | 5/2008 | Hartmann et al. | | JP | 2007-228603 | 9/2007 |
| 2008/0145061 A1 | 6/2008 | Lee et al. | | JP | 2008-172597 | 7/2008 |
| 2008/0150514 A1 | 6/2008 | Codreanu et al. | | WO | 9810600 A1 | 3/1998 |
| 2008/0194226 A1 | 8/2008 | Rivas et al. | | WO | 0042721 A1 | 7/2000 |
| 2008/0212969 A1 | 9/2008 | Fasshauer et al. | | WO | WO 01/78434 A1 | 10/2001 |
| 2008/0219670 A1 | 9/2008 | Kim et al. | | WO | 0221183 A1 | 3/2002 |
| 2008/0232799 A1 | 9/2008 | Kim | | WO | WO0230141 A1 | 4/2002 |
| 2008/0247716 A1 | 10/2008 | Thomas et al. | | WO | WO02/102102 A1 | 12/2002 |
| 2008/0253773 A1 | 10/2008 | Zheng | | WO | 03024027 A1 | 3/2003 |
| 2008/0260388 A1 | 10/2008 | Kim et al. | | WO | WO03/098175 A1 | 11/2003 |
| 2008/0273844 A1 | 11/2008 | Kewitsch | | WO | WO2004/030154 A2 | 4/2004 |
| 2008/0298813 A1 | 12/2008 | Song et al. | | WO | WO2004/047472 A1 | 6/2004 |
| 2008/0304831 A1 | 12/2008 | Miller, II et al. | | WO | 2004059934 A1 | 7/2004 |
| 2008/0310848 A1 | 12/2008 | Yasuda et al. | | WO | WO2004/056019 A1 | 7/2004 |
| 2009/0041413 A1 | 2/2009 | Hurley | | WO | WO2004056019 A1 | 7/2004 |
| 2009/0047023 A1 | 2/2009 | Pescod et al. | | WO | WO2004/086795 A2 | 10/2004 |
| 2009/0061939 A1 | 3/2009 | Andersson et al. | | WO | WO2004/093471 A2 | 10/2004 |
| 2009/0135078 A1 | 5/2009 | Lindmark et al. | | WO | WO2004/093471 A3 | 10/2004 |
| 2009/0154621 A1 | 6/2009 | Shapira et al. | | WO | WO2005/062505 A1 | 7/2005 |
| | | | | WO | WO2005/069203 A2 | 7/2005 |
| FOREIGN PATENT DOCUMENTS | | | | WO | WO2005/073897 A1 | 8/2005 |
| AU | 731180 | 3/1998 | | WO | WO2005/079386 A2 | 9/2005 |
| CA | 2065090 C | 4/1992 | | WO | WO2005/101701 A2 | 10/2005 |
| CA | 2242707 A1 | 1/1999 | | WO | WO2005/111959 A2 | 11/2005 |
| DE | 20104862 U1 | 8/2001 | | WO | WO2006/011778 A1 | 2/2006 |
| DE | 10249414 A1 | 5/2004 | | WO | WO2006/018592 A1 | 2/2006 |
| EP | 0477952 A2 | 9/1991 | | WO | WO2006/018592 A1 | 2/2006 |
| EP | 0477952 A3 | 9/1991 | | WO | WO2006/019392 A1 | 2/2006 |
| EP | 0461583 B1 | 3/1997 | | WO | 2006039941 A1 | 4/2006 |
| EP | 0687400 B1 | 11/1998 | | WO | 2006051262 A1 | 5/2006 |
| EP | 0993124 A2 | 4/2000 | | WO | 2006133609 A1 | 12/2006 |
| EP | 9003124 A3 | 4/2000 | | WO | WO2006/136811 A1 | 12/2006 |
| EP | 1037411 A2 | 9/2000 | | WO | 2007048427 A1 | 5/2007 |
| EP | 1267447 B1 | 1/2001 | | WO | WO2007/077451 A1 | 7/2007 |
| EP | 1202475 A2 | 5/2002 | | WO | 2007088561 A1 | 8/2007 |
| EP | 1363352 A1 | 11/2003 | | WO | WO2007/091026 A1 | 8/2007 |
| EP | 1391897 A1 | 2/2004 | | WO | 2008008249 A2 | 1/2008 |
| EP | 1443687 A1 | 8/2004 | | WO | 2008027213 A2 | 3/2008 |
| EP | 1455550 A2 | 9/2004 | | WO | WO2008/033298 A2 | 3/2008 |
| EP | 1501206 A1 | 1/2005 | | WO | 2008039830 A1 | 4/2008 |
| EP | 1503451 A1 | 2/2005 | | WO | 2006046088 A1 | 5/2009 |
| EP | 1530316 A | 5/2005 | | | | |
| EP | 1511203 B1 | 3/2006 | | | | |
| EP | 1693974 A1 | 8/2006 | | | | |
| EP | 1742388 A1 | 1/2007 | | | | |
| EP | 1227605 B1 | 1/2008 | | | | |
| EP | 1968250 A1 | 9/2008 | | | | |
| EP | 1056226 B1 | 4/2009 | | | | |
| EP | 1357683 B1 | 5/2009 | | | | |
| GB | 2323252 A | 9/1998 | | | | |
| GB | 2399963 A | 9/2004 | | | | |
| GB | 2428149 A | 1/2007 | | | | |
| JP | 5260018 A | 8/1993 | | | | |
| JP | 083450 A | 3/1997 | | | | |
| JP | 9162810 A | 6/1997 | | | | |

OTHER PUBLICATIONS

Paulraj, A., Gore, D., Nabar, R. and Bölcskei, H., "An Overview of MIMO Communications—A Key to Gigabit Wireless", Proceedings of the IEEE, vol. 92, No. 2, Feb. 2004.

Niiho, T., Nakaso, M., Sasai, H., Utsumi, K., and Fuse M., "Multi-channel Wireless LAN Distributed Antenna System Based on Radio-Over-Fiber Techniques", Lasers and Electro-Optics Society 2004, LEOS 2004, The 17th Annual Meeting of the IEEE, vol. 1, Nov. 7-11, 2004, pp. 57-58, vol. 1.

Roh, W. and Paulraj, A., "MIMO Channel Capacity for the Distributed Antenna Systems", Vehicular Technology Conference, 2002. Proceedings. VTC 2002-Fall. 2002 IEEE 56th, vol. 2, Sep. 24-28, 2002 pp. 706-709 vol. 2.

Shen, C., Zhou, S. and Yao, Y., "Comparison of Channel Capacity for MIMO-DAS versus MIMO-CAS", Communications, 2003. APCC 2003. The 9th Asia-Pacific Conference on vol. 1, Sep. 21-24, 2003 pp. 113-118 vol. 1.

Cooper, A.J., "Fiber/Radio for the Provision of Cordless/Mobile Telephony Services in the Access Network," Electronics Letters, vol. 26, pp. 2054-2056, 1990.

Bakaul, M. et al., "Efficient Multiplexing Scheme for Wavelength-Interleaved DWDM Millimeter-Wave Fiber-Radio Systems," IEEE Photonics Technology Letters, vol. 17, No. 12, Dec. 2005.

D. Huang, C. Chiu, "A WLAN-Used Helical Antenna Fully Integrated with the PCMCIA Carrier," IEEE Trans. Ant. and Prop., vol. 53, No. 12, pp. 4164-4168, Dec. 2005.

Gibson et al., "Evanescent Field Analysis of Air-Silica Microstructure Waveguides," IEEE, 1-7803-7104-4/01, 2001, pp. 709-710.

ITU-T G.652, Telecommunication Standardization Sector of ITU, Jun. 2005, Series G: Transmission Systems and Media, Digital Systems and Networks, Transmission Media and Optical Systems Characteristics—Optical Fiber Cables, Characteristics of a Single-Mode Optical Fiber and Cable, ITU-T Recommendation G.652, 22 pages.

ITU-T G.657, Telecommunication Standardization Sector of ITU, Dec. 2006, Series G: Transmission Systems and Media, Digital Systems and Networks, Transmission Media and Optical Systems Characteristics—Optical Fiber Cables, Characteristics of a Bending Loss Insensitive Single Mode Optical Fiber and Cable for the Access Network, ITU-T Recommendation G.657, 20 pages.

Kojucharow, K. et al., "Millimeter-Wave Signal Properties Resulting from Electrooptical Upconversion," IEEE Transaction on Microwave Theory and Techniques, vol. 49, No. 10, Oct. 2001, pp. 1977-1985.

Monro et al., "Holey Fibers with Random Cladding Distributions," Optics Letters, vol. 25, No. 4, Feb. 15, 2000.

Moreira, J.D. et al., "Diversity Techniques for OFDM Based WLAN Systems," pp. 1008-1011, PIMRC 2002 IEEE.

Winters, J., Salz, J., and Gitlin, R., "The Impact of Antenna Diversity on the Capacity of Wireless Communications Systems," IEEE Transcations on Communications, vol. 42, No. 2/3/4, Feb./Mar./Apr. 1994.

Wake, D. et al., "Passive Picocell: A New Concept in Wireless Network Infrastructure," Electronics Letters, vol. 33, No. 5, Feb. 27, 1997, pp. 404-406.

Pickrell et al., "Novel Techniques for the Fabrication of Holey Optical Fibers," Spie Conference Proceedings, vol. 4578, pp. 271-282, 2001.

RFID Technology Overview, 11 pages, 2004.

Seto, I. et al., "Antenna-Selective Trasmit Diversity Technique for OFDM-Based WLANs with Dual-Band Printed Antennas," pp. 51-56, IEEE Communications Society/WCNC 2005.

Opatic, D., "Radio over Fiber Technology for Wireless Access," Oct. 17, 2009, 6 pages.

* cited by examiner

US 7,848,654 B2

RADIO-OVER-FIBER (ROF) WIRELESS PICOCELLULAR SYSTEM WITH COMBINED PICOCELLS

CROSS-REFERENCE TO RELATED APPLICATIONS

This application is related to U.S. patent application Ser. No. 11/451,553, entitled "Centralized optical-fiber based wireless picocellular systems and methods," filed on Jun. 12, 2006, the content of which is relied upon and incorporated herein by reference in its entirety.

BACKGROUND OF THE INVENTION

1. Field of the Invention

The present invention relates generally to wireless communication systems, and in particular relates to centralized optical-fiber-based wireless systems and methods employing radio-frequency (RF) transmission over optical fiber.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (coffee shops, airports, libraries, etc.). Wireless communication systems communicate with wireless devices called "clients," which must reside within the wireless range or "cell coverage area" in order to communicate with the access point device.

One approach to deploying a wireless communication system involves the use of "picocells," which are radio-frequency (RF) coverage areas having a radius in the range from about a few meters up to about 20 meters. Because a picocell covers a small area, there are typically only a few users (clients) per picocell. Picocells also allow for selective wireless coverage in small regions that otherwise would have poor signal strength when covered by larger cells created by conventional base stations.

In conventional wireless systems, picocells are created by and centered on a wireless access point device connected to a head-end controller. The wireless access point device includes digital information processing electronics, a RF transmitter/receiver, and an antenna operably connected to the RF transmitter/receiver. The size of a given picocell is determined by the amount of RF power transmitted by the access point device, the receiver sensitivity, antenna gain and the RF environment, as well as by the RF transmitter/receiver sensitivity of the wireless client device. Client devices usually have a fixed RF receiver sensitivity, so that the above-mentioned properties of the access point device mainly determine the picocell size. Combining a number of access point devices connected to the head-end controller creates an array of picocells that cover an area called a "picocellular coverage area." A closely packed picocellular array provides high per-user data-throughput over the picocellular coverage area.

Prior art wireless systems and networks are wire-based signal distribution systems where the access point devices are treated as separate processing units linked to a central location. This makes the wireless system/network relatively complex and difficult to scale, particularly when many picocells need to cover a large region. Further, the digital information processing performed at the access point devices requires that these devices be activated and controlled by the head-end controller, which further complicates the distribution and use of numerous access point devices to produce a large picocellular coverage area.

While wireless picocell systems are generally robust, there are some limitations. One limitation is the data transmission capacity when the transponders have a single antenna. The data transmission capacity can be increased by adding more antennas to each transponder, but this requires that more uplink and downlink optical fibers be added to the system, which greatly increases system cost. Also, the ability to exploit antenna diversity is curtailed when each picocell has only a single associated antenna system. In some instances, client devices designed to exploit antenna diversity (e.g., laptop computers that have a wireless card with two antennas) cannot optimally function because of the single-antenna transponders.

SUMMARY OF THE INVENTION

One aspect of the invention is a centralized optical-fiber-based wireless picocellular system for wirelessly communicating with at least one client device. The system includes a central head-end station adapted to provide radio-frequency (RF) signals. The system also includes two or more transponders optically coupled to the central head-end station via one or more optical fiber RF communication links. The transponders are adapted to convert electrical signals to optical signals and vice versa. The transponders also have an antenna system that forms a corresponding picocell based on the RF signals from the central head-end station. Adjacent picocells formed from RF signals having different frequencies do not substantially overlap, while adjacent picocells formed from RF signals having the same (i.e., a common) frequency substantially overlap. The central head-end station is adapted to provide one or more groups of two or more transponders with a common frequency for each group, thereby forming corresponding one or more combined picocells.

Another aspect of the invention is a method for a centralized optical-fiber-based wireless picocellular system having a central head-end station, wherein the method is directed to combining two or more picocells that are substantially non-overlapping when operated at different RF frequencies. The method includes operating a group of two or more neighboring picocells at a common RF frequency provided by the central head-end station to provide substantial overlap of the two or more neighboring picocells to form a combined picocell.

Another aspect of the invention is a method of forming a combined picocell in a wireless picocellular system. The system is adapted to form individual picocells that do not substantially overlap when operated at the same frequency. The system utilizes one transponder per picocell, with the transponders optically coupled to a central head-end station and having an antenna system. The method includes providing at the central head-end station a downlink RF signal, and sending this signal to corresponding two or more neighboring transponders at a common frequency so that the two or more neighboring transponders substantially overlap to form a combined picocell. The downlink RF signal is sent either simultaneously or non-simultaneously to the two or more transponders, depending on the particular approach the system uses to communicate with a client device. Example approaches include antenna diversity, forming a phased-array antenna network, and performing multiple-input/multiple-output (MIMO).

Additional features and advantages of the invention are set forth in the detailed description that follows, and will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

Accordingly, various basic electronic circuit elements and signal-conditioning components, such as bias tees, RF filters, amplifiers, power dividers, etc., are not all shown in the Figures for ease of explanation and illustration. The application of such basic electronic circuit elements and components to the systems of the present invention will be apparent to one skilled in the art.

DETAILED DESCRIPTION OF THE PREFERRED EMBODIMENTS

Reference is now made in detail to the present preferred embodiments of the invention, examples of which are illustrated in the accompanying drawings. Whenever possible, the same or analogous reference numbers are used throughout the drawings to refer to the same or like parts.

Generalized Optical-Fiber-Based Wireless System

Figure 1:
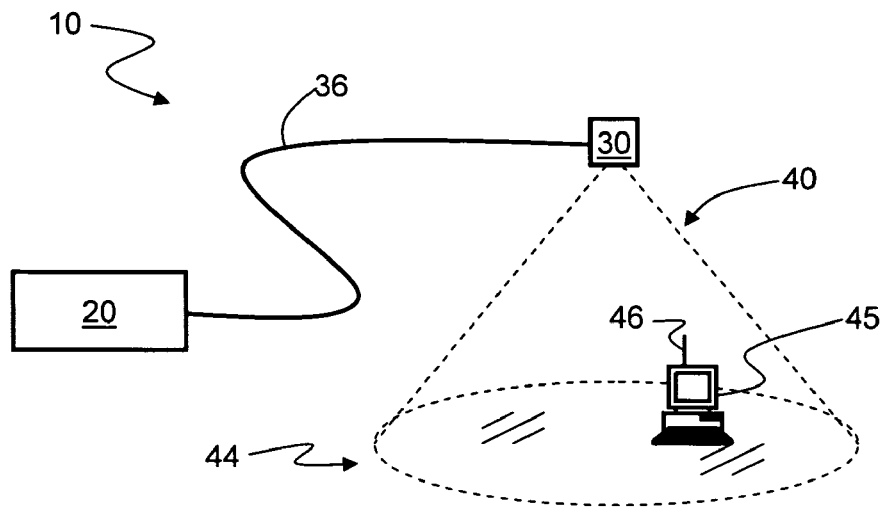
FIG. 1 is a schematic diagram of a generalized embodiment of an optical-fiber-based wireless picocellular system according to the present invention showing a head-end unit optically coupled to a transponder via an optical fiber RF communication link, along with the picocell formed by the transponder and a client device within the picocell.

FIG. 1 is a schematic diagram of a generalized embodiment of an optical-fiber-based wireless picocellular system 10 according to the present invention. System 10 includes a head-end unit 20, one or more transponder units ("transponder") 30 and an optical fiber RF communication link 36 that optically couples the head-end unit to the transponder. As discussed in detail below, system 10 has a picocell 40 substantially centered about transponder 30. The one or more transponders 30 form a picocellular coverage area 44. Head-end unit 20 is adapted to perform or to facilitate any one of a number of RF-over-fiber applications, such as radio-frequency identification (RFID), wireless local-area network (WLAN) communication, or cellular phone service. Shown within picocell 40 is a client device 45 in the form of a computer. Client device 45 includes an antenna 46 (e.g., a wireless card) adapted to receive and/or send electromagnetic RF signals.

Figure 2:
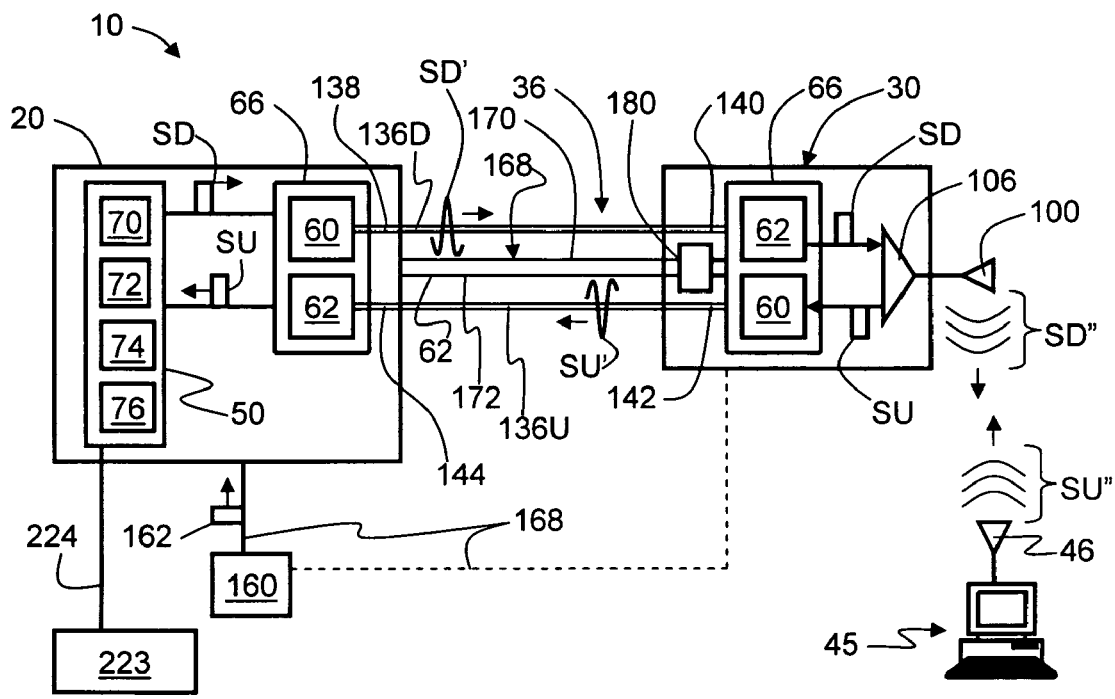
FIG. 2 is a detailed schematic diagram of an example embodiment of the system of FIG. 1, showing the details of the head-end unit, the optical fiber RF communication link and the transponder.

FIG. 2 is a detailed schematic diagram of an example embodiment of system 10 of FIG. 1. In an example embodiment, head-end unit 20 includes a service unit 50 that provides electrical RF service signals for a particular wireless service or application. In an example embodiment, service unit 50 provides electrical RF service signals by passing (or conditioning and then passing) such signals from one or more outside networks 223, as described below. In a particular example embodiment, this includes providing WLAN signal distribution as specified in the IEEE 802.11 standard, i.e., in the frequency range from 2.4 to 2.5 GHz and from 5.0 to 6.0 GHz. In another example embodiment, service unit 50 provides electrical RF service signals by generating the signals directly. In another example embodiment, service unit 50 coordinates the delivery of the electrical RF service signals between client devices within picocellular coverage area 44.

Service unit 50 is electrically coupled to an electrical-to-optical (E/O) converter 60 that receives an electrical RF service signal from the service unit and converts it to corresponding optical signal, as discussed in greater detail below. In an example embodiment, E/O converter 60 includes a laser suitable for delivering sufficient dynamic range for the RF-over-fiber applications of the present invention, and optionally includes a laser driver/amplifier electrically coupled to the laser. Examples of suitable lasers for E/O converter 60 include laser diodes, distributed feedback (DFB) lasers, Fabry-Perot (FP) lasers, and vertical cavity surface emitting lasers (VCSELs).

Head-end unit 20 also includes an optical-to-electrical (O/E) converter 62 electrically coupled to service unit 50. O/E converter 62 receives an optical RF service signal and converts it to a corresponding electrical signal. In an example embodiment, O/E converter is a photodetector, or a photodetector electrically coupled to a linear amplifier. E/O converter 60 and O/E converter 62 constitute a "converter pair" 66.

In an example embodiment, service unit 50 includes a RF signal modulator/demodulator unit 70 that generates an RF carrier of a given frequency and then modulates RF signals onto the carrier, and that also demodulates received RF signals. Service unit 50 also includes a digital signal processing unit ("digital signal processor") 72, a central processing unit (CPU) 74 for processing data and otherwise performing logic and computing operations, and a memory unit 76 for storing data, such as system settings and status information, RFID tag information, etc. In an example embodiment, the different frequencies associated with the different signal channels are created by modulator/demodulator unit 70 generating different RF carrier frequencies based on instructions from CPU 74. Also, as described below, the common frequencies associated with a particular combined picocell are created by modulator/demodulator unit 70 generating the same RF carrier frequency.

With continuing reference to FIG. 2, in an example embodiment transponder 30 includes a converter pair 66, wherein the E/O converter 60 and the O/E converter 62 therein are electrically coupled to an antenna system 100 via a RF signal-directing element 106, such as a circulator. Signal-directing element 106 serves to direct the downlink and uplink electrical RF service signals, as discussed below. In an example embodiment, antenna system 100 includes one or more patch antennas, such as disclosed in U.S. patent application Ser. No. 11/504,999 filed on Aug. 16, 2006, which patent application is incorporated herein by reference.

Figure 3:
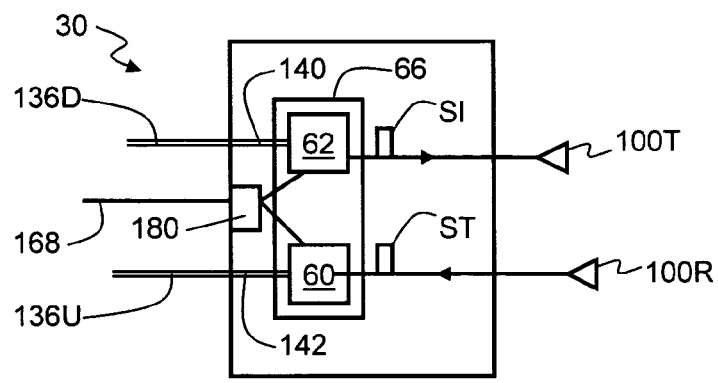
FIG. 3 is a close-up view of an alternative example embodiment for the transponder of the wireless system of FIG. 2, wherein the transponder includes a transmitting antenna and a receiving antenna.

FIG. 3 is a close-up view of an alternative example embodiment for transponder 30 that includes two antennae: a transmitting antenna 100T electrically coupled to O/E converter 62, and a receiving antenna 100R electrically coupled to O/E converter 60. The two-antenna embodiment obviates the need for RF signal-directing element 106.

Transponders 30 of the present invention differ from the typical access point device associated with wireless communication systems in that the preferred embodiment of the transponder has just a few signal-conditioning elements and no digital information processing capability. Rather, the information processing capability is located remotely in head-end unit 20, and in a particular example, in service unit 50. This allows transponder 30 to be very compact and virtually maintenance free. In addition, the preferred example embodiment of transponder 30 consumes very little power, is transparent to RF signals, and does not require a local power source, as described below.

With reference again to FIG. 2, an example embodiment of optical fiber RF communication link 36 includes a downlink optical fiber 136D having an input end 138 and an output end 140, and an uplink optical fiber 136U having an input end 142 and an output end 144. The downlink and uplink optical fibers 136D and 136U optically couple converter pair 66 at head-end unit 20 to the converter pair at transponder 30. Specifically, downlink optical fiber input end 138 is optically coupled to E/O converter 60 of head-end unit 20, while output end 140 is optically coupled to O/E converter 62 at transponder 30. Similarly, uplink optical fiber input end 142 is optically coupled to E/O converter 60 of transponder 30, while output end 144 is optically coupled to O/E converter 62 at head-end unit 20.

In an example embodiment, the optical-fiber-based wireless picocellular system 10 of the present invention employs a known telecommunications wavelength, such as 850 nm, 1300 nm, or 1550 nm. In another example embodiment, system 10 employs other less common but suitable wavelengths such as 980 nm.

Example embodiments of system 10 include either single-mode optical fiber or multimode optical fiber for downlink and uplink optical fibers 136D and 136U. The particular type of optical fiber depends on the application of system 10. For many in-building deployment applications, maximum transmission distances typically do not exceed 300 meters. The maximum length for the intended RF-over-fiber transmission needs to be taken into account when considering using multi-mode optical fibers for downlink and uplink optical fibers 136D and 136U. For example, it has been shown that a 1400 MHz·km multi-mode fiber bandwidth-distance product is sufficient for 5.2 GHz transmission up to 300 m.

In an example embodiment, the present invention employs 50 μm multi-mode optical fiber for the downlink and uplink optical fibers 136D and 136U, and E/O converters 60 that operate at 850 nm using commercially available VCSELs specified for 10 Gb/s data transmission. In a more specific example embodiment, OM3 50 µm multi-mode optical fiber is used for the downlink and uplink optical fibers 136D and 136U.

Wireless system 10 also includes a power supply 160 that generates an electrical power signal 162. Power supply 160 is electrically coupled to head-end unit 20 for powering the power-consuming elements therein. In an example embodiment, an electrical power line 168 runs through the head-end unit and over to transponder 30 to power E/O converter 60 and O/E converter 62 in converter pair 66, the optional RF signal-directing element 106 (unless element 106 is a passive device such as a circulator), and any other power-consuming elements (not shown). In an example embodiment, electrical power line 168 includes two wires 170 and 172 that carry a single voltage and that are electrically coupled to a DC power converter 180 at transponder 30. DC power converter 180 is electrically coupled to E/O converter 60 and O/E converter 62, and changes the voltage or levels of electrical power signal 162 to the power level(s) required by the power-consuming components in transponder 30. In an example embodiment, DC power converter 180 is either a DC/DC power converter, or an AC/DC power converter, depending on the type of power signal 162 carried by electrical power line 168. In an example embodiment, electrical power line 168 includes standard electrical-power-carrying electrical wire(s), e.g., 18-26 AWG (American Wire Gauge) used in standard telecommunications and other applications. In another example embodiment, electrical power line 168 (dashed line) runs directly from power supply 160 to transponder 30 rather than from or through head-end unit 20. In another example embodiment, electrical power line 168 includes more than two wires and carries multiple voltages.

In an example embodiment, head-end unit 20 is operably coupled to an outside network 223 via a network link 224.

Method of Operation

With reference to the optical-fiber-based wireless picocellular system 10 of FIG. 1 and FIG. 2, service unit 50 generates an electrical downlink RF service signal SD ("electrical signal SD") corresponding to its particular application. In an example embodiment, this is accomplished by digital signal processor 72 providing the RF signal modulator 70 with an electrical signal (not shown) that is modulated onto a RF carrier to generate a desired electrical signal SD.

Electrical signal SD is received by E/O converter 60, which converts this electrical signal into a corresponding optical downlink RF signal SD' ("optical signal SD'"), which is then coupled into downlink optical fiber 136D at input end 138. It is noted here that in an example embodiment optical signal SD' is tailored to have a given modulation index. Further, in an example embodiment the modulation power of E/O converter 60 is controlled (e.g., by one or more gain-control amplifiers, not shown) to vary the transmission power from antenna system 100. In an example embodiment, the amount of power provided to antenna system 100 is varied to define the size of the associated picocell 40, which in example embodiments range anywhere from about a meter across to about twenty meters across.

Optical signal SD' travels over downlink optical fiber 136 to output end 140, where it is received by O/E converter 62 in transponder 30. O/E converter 62 converts optical signal SD' back into electrical signal SD, which then travels to signal-directing element 106. Signal-directing element 106 then directs electrical signal SD to antenna 100. Electrical signal SD is fed to antenna system 100, causing it to radiate a corresponding electromagnetic downlink RF signal SD" ("electromagnetic signal SD'''").

Because client device 45 is within picocell 40, electromagnetic signal SD" is received by client device antenna 46, which may be part of a wireless card, or a cell phone antenna, for example. Antenna 46 converts electromagnetic signal SD" into electrical signal SD in the client device (signal SD is not shown therein). Client device 45 then processes electrical signal SD, e.g., stores the signal information in memory, displays the information as an e-mail or text message, etc.

In an example embodiment, client device 45 generates an electrical uplink RF signal SU (not shown in the client device), which is converted into an electromagnetic uplink RF signal SU" (electromagnetic signal SU''''") by antenna 46.

Because client device 45 is located within picocell 40, electromagnetic signal SU" is detected by transponder antenna system 100, which converts this signal back into electrical signal SU. Electrical signal SU is directed by signal-directing element 106 to E/O converter 60, which converts this electrical signal into a corresponding optical uplink RF signal SU' ("optical signal SU'"), which is then coupled into input end 142 of uplink optical fiber 136U. Optical signal SU' travels over uplink optical fiber 136U to output end 144, where it is received by O/E converter 62 at head-end unit 20. O/E converter 62 converts optical signal SU' back into electrical signal SU, which is then directed to service unit 50. Service unit 50 receives and processes signal SU, which in an example embodiment includes one or more of the following: storing the signal information; digitally processing or conditioning the signals; sending the signals on to one or more outside networks 223 via network links 224; and sending the signals to one or more client devices 45 in picocellular coverage area 44. In an example embodiment, the processing of signal SU includes demodulating this electrical signal in RF signal modulator/demodulator unit 70, and then processing the demodulated signal in digital signal processor 72.

System with Central Head-End Station and Optical Fiber Cable

Figure 4:
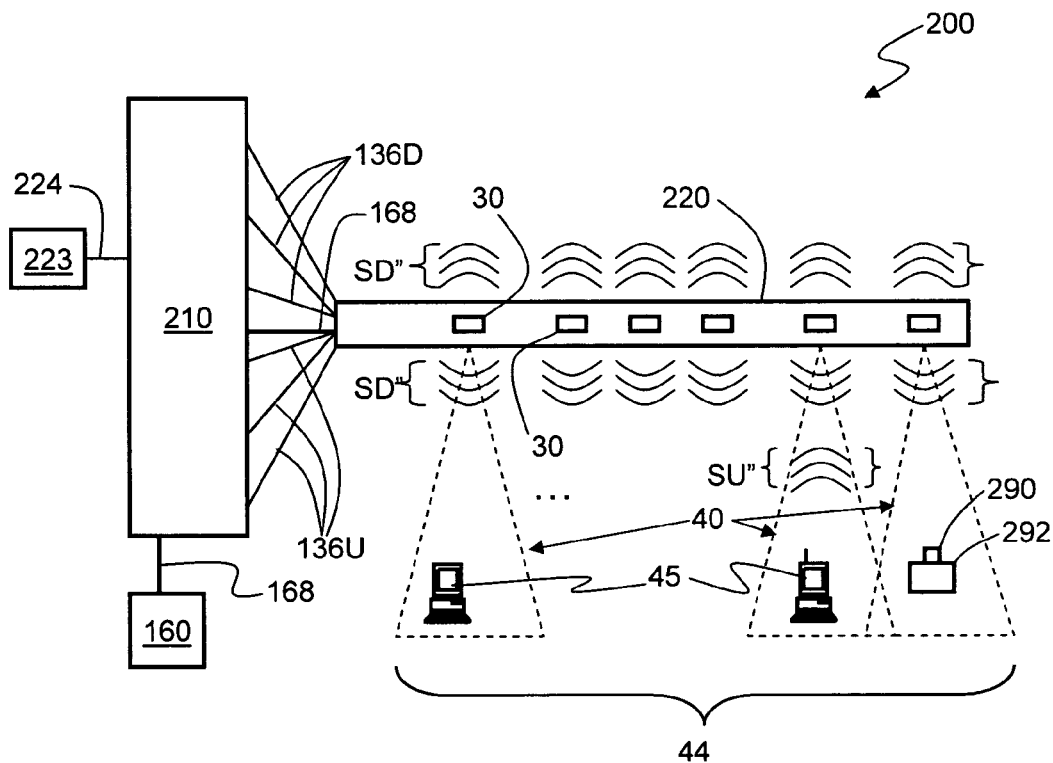
FIG. 4 is a schematic diagram of an example embodiment of an optical-fiber-based wireless picocellular system according to the present invention that utilizes a central head-end station and multiple transponders arranged along an optical fiber cable.

FIG. 4 is a schematic diagram of an example embodiment of an optical-fiber-based wireless picocellular system 200 that includes a central head-end station 210. Central head-end station 210 can be thought of as a head-end unit 20 adapted to handle one or more service units 50 and one or more transponders 30. Central head-end station 210 is optically coupled to an optical fiber cable 220 that includes multiple transponders 30. Optical fiber cable 220 is constituted by multiple optical fiber RF communication links 36, with each link optically coupled to a corresponding transponder 30. In an example embodiment, multiple transponders 30 are spaced apart along the length of optical fiber cable 220 (e.g., at 8 meter intervals) to create a desired picocell coverage area 44 made up of picocells 40, which in practice overlap at the edges.

Figure 5:
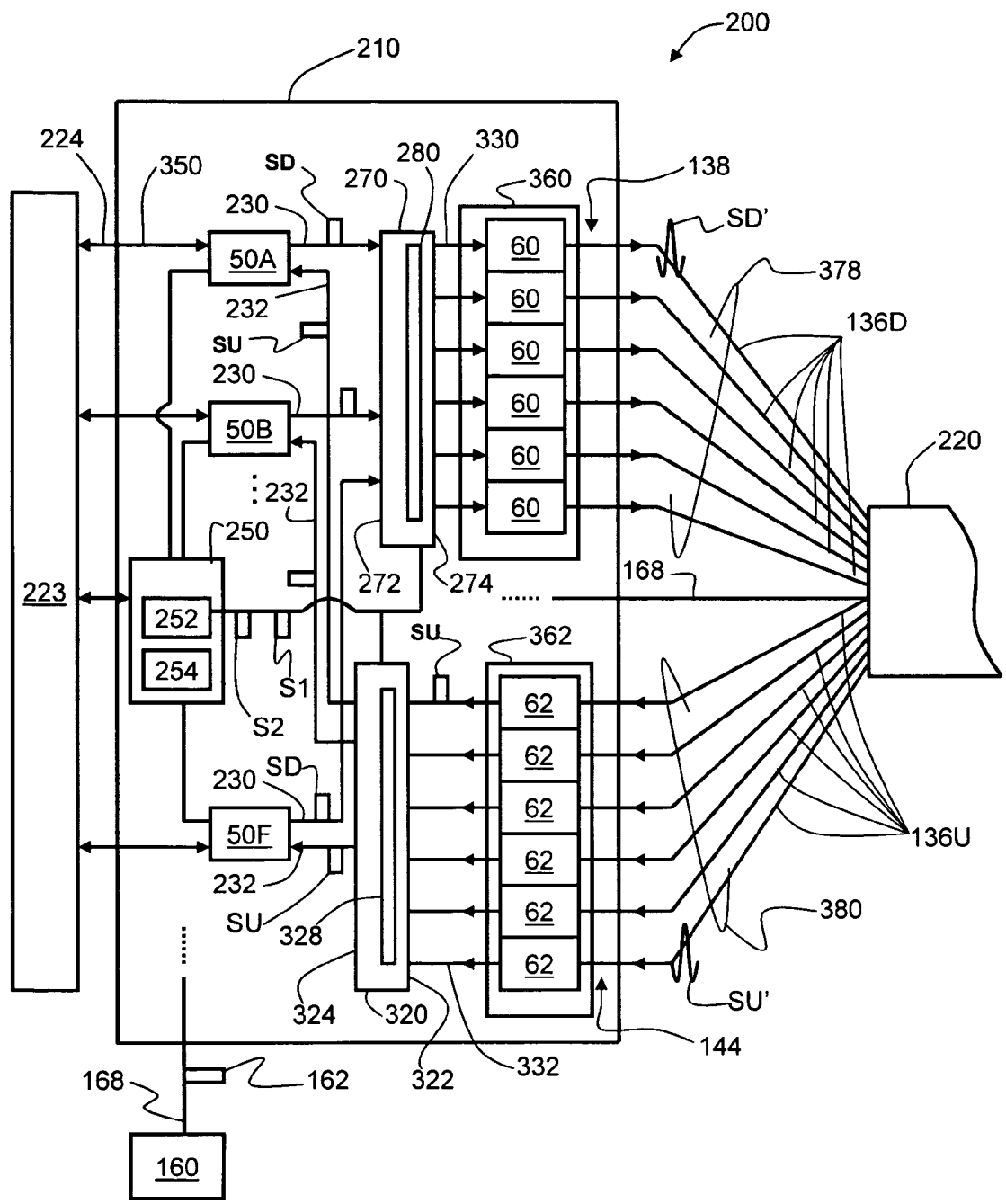
FIG. 5 is a detailed schematic diagram of an example embodiment of the central head-end station of the system of FIG. 4.

FIG. 5 is a detailed schematic diagram of an example embodiment of central head-end control station 210. Rather than including multiple head-end units 20 of FIG. 1 directly into head-end control station 210, in an example embodiment the head-end units are modified to allow for each service unit 50 to communicate with one, some, or all of transponders 30, depending on the particular application of a given service unit. Service units 50 are each electrically coupled to a RF transmission line 230 and a RF receiving line 232. In FIG. 5, three of six service units 50A through 50F are shown for the sake of illustration.

In an example embodiment, system 200 further includes a main controller 250 operably coupled to service units 50 and adapted to control and coordinate the operation of the service units in communicating with transponders 30. In an example embodiment, controller 250 includes a central processing unit (CPU) 252 and a memory unit 254 for storing data. CPU 252 is adapted (e.g., is programmed) to process information provided to controller 250 by one or more of service units 50. In an example embodiment, controller 250 is or includes a programmable computer adapted to carry out instructions (programs) provided to it or otherwise encoded therein on a computer-readable medium.

Central head-end station 210 further includes a downlink RF signal multiplexer ("downlink multiplexer") 270 operably coupled to controller 250. Downlink multiplexer unit 270 has an input side 272 and an output side 274. Transmission lines 230 are electrically connected to downlink multiplexer 270 at input side 272.

In an example embodiment, downlink multiplexer 270 includes a RF signal-directing element 280 (e.g., a RF switch) that allows for selective communication between service units 50 and transponders 30, as described below. In an example, the selective communication involves sequentially addressing transponders 30 for polling corresponding picocells 40. Such sequential polling can be used, for example, when one of service units 50 is a RFID reader searching for RFID tags 290 in picocells 40 (FIG. 4). In an example embodiment, RFID tags 290 are attached to an item 292 to be tracked or otherwise monitored via the attached RFID tag. In another example embodiment, the selective communication involves simultaneously addressing some or all of transponders 30. Such simultaneous addressing can be used, for example, when one of service units 50 is a cellular phone transmitter or a RF-signal feed-through unit that provides simultaneous coverage of some or all of picocells 40.

Central head-end station 210 also includes an uplink RF signal multiplexer ("uplink multiplexer") 320 operably coupled to controller 250 and having an input side 322 and an output side 324. Receiving lines 232 are electrically connected to uplink multiplexer 320 at output side 324. In an example embodiment, uplink multiplexer 320 includes a RF signal-directing element 328.

Central head-end station 210 also includes a number of E/O converters 60 that make up an E/O converter array 360, and a corresponding number of O/E converters 62 that make up an O/E converter array 362. E/O converters 60 are electrically coupled to output side 274 of downlink multiplexer 270 via electrical lines 330, and are optically coupled to input ends 138 of corresponding downlink optical fibers 136D. O/E converters 62 are electrically coupled to input side 322 of uplink multiplexer 320 via electrical lines 332, and are optically coupled to output ends 144 of corresponding uplink optical fiber 136U. Downlink optical fibers 136D constitute a downlink optical fiber cable 378 and uplink optical fibers 136U constitute an uplink optical fiber cable 380.

Figure 6A:
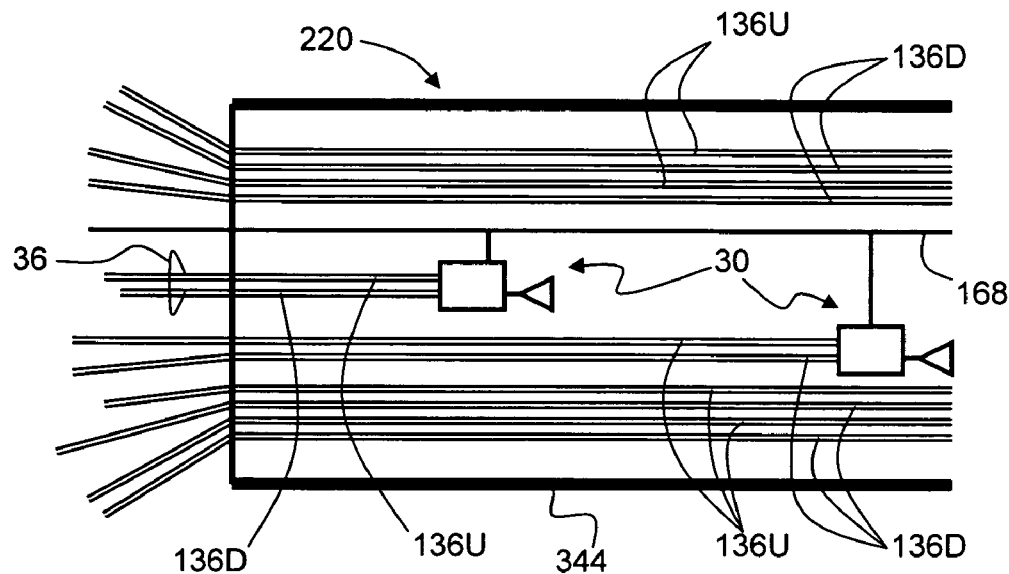
FIG. 6A is a close-up cut-away view of the optical fiber cable of the system of FIG. 4, showing two transponders, the downlink and uplink optical fibers, and the electrical power line that powers the transponders.

FIG. 6A is a close-up schematic diagram of optical fiber cable 220 showing downlink and uplink optical fibers 136D and 136U and two of the six transponders 30. Also shown is electrical power line 168 electrically coupled to transponders 30. In an example embodiment, optical fiber cable 220 includes a protective outer jacket 344. In an example embodiment, transponders 30 reside completely within outer jacket 344.

Figure 6B:
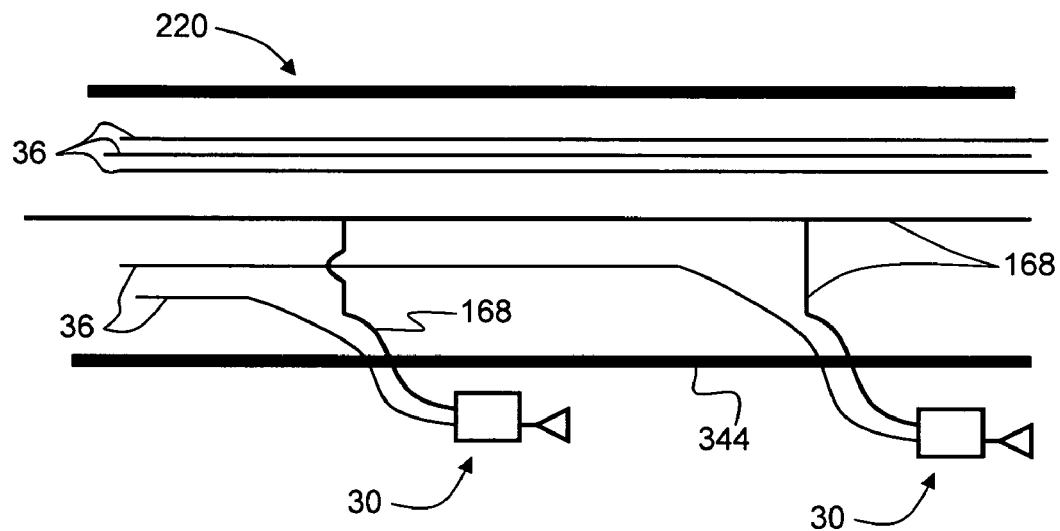
FIG. 6B is a schematic diagram similar to FIG. 6A, illustrating an example embodiment wherein transponders lie outside of the protective outer jacket of the optical fiber cable.

FIG. 6B is a schematic diagram similar to FIG. 6A, illustrating an example embodiment wherein transponders 30 lie outside of protective outer jacket 344. Having transponders 30 lie outside of protective outer jacket 344 makes it easier to arrange the transponders relative to a building infrastructure after the optical fiber cable is deployed, as described below.

Method of Operation

With reference to FIGS. 4, 5, 6A and 6B, optical-fiber-based wireless picocellular system 200 operates as follows. At central head-end station 210, service units 50A, 50B, . . . 50F each generate or pass through from one or more outside networks 223 respective electrical signals SD that correspond to the particular application of the given service unit. Electrical signals SD are transmitted over RF transmission lines 230 to downlink multiplexer 270. Downlink multiplexer 270 then combines (in frequency) and distributes the various signals SD to E/O converters 60 in E/O converter array 360. In an example embodiment, downlink multiplexer 270 and RF signal-directing element 280 therein are controlled by controller 250 via a control signal S1 to direct signals SD to one, some or all of E/O converters 60 in E/O converter array 360 and thus to one, some or all of transponders 30, based on the particular service unit application. For example, if service unit 50A is a cellular phone unit, then in an example embodiment signals SD therefrom (e.g., passing therethrough from one or more outside networks 223) are divided (and optionally amplified) equally by RF signal-directing element 280 and provided to each E/O converter 60 in E/O converter array 360. This results in each transponder 30 being addressed. On the other hand, if service unit 50F is a WLAN service unit, then RF signal-directing element 280 may be adapted (e.g., programmed) to direct signals SD to select ones of E/O converters 60 in E/O converter array 360 so that only select transponders 30 are addressed.

Thus, one, some, or all of E/O converters 60 in E/O converter array 360 receive electrical signals SD from downlink multiplexer 270. The addressed E/O converters 60 in E/O converter array 360 convert electrical signals SD into corresponding optical signals SD', which are transmitted over the corresponding downlink optical fibers 136D to the corresponding transponders 30. The addressed transponders 30 convert optical signals SD' back into electrical signals SD, which are then converted into electromagnetic signals SD" that correspond to the particular service unit application.

Figure 7:
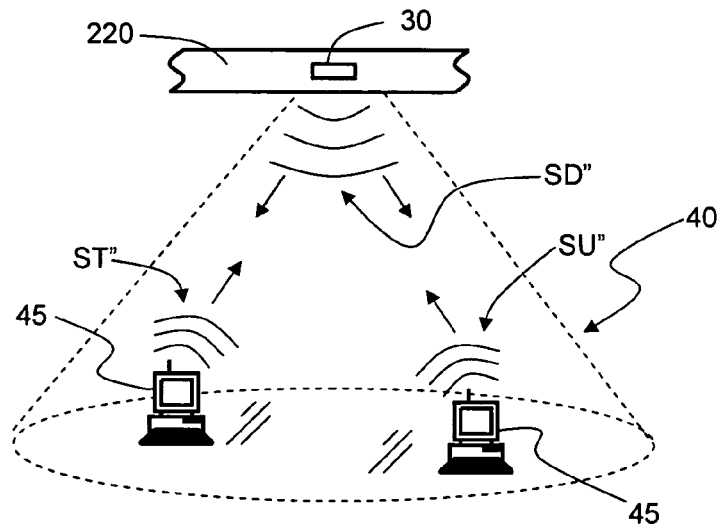
FIG. 7 is a close-up view of one of the transponders in the optical fiber cable, illustrating the corresponding picocell and the exchange of electromagnetic RF service signals between the transponder and client devices within the picocell.

FIG. 7 is a close-up view of one of transponders 30 in optical fiber cable 220, illustrating the corresponding picocell 40 and the exchange of downlink and uplink electromagnetic signals SD" and SU" between the transponder and client devices 45 within the picocell. In particular, electromagnetic signals SU" are received by the corresponding transponder 30 and converted to electrical signals SU, and then to optical signals SD'. Optical signals SD' then travel over uplink optical fiber 136U and are received by O/E converter array 362 and the corresponding O/E converters 62 therein for the addressed transponders 30. The O/E converters 60 convert optical signals SU' back to electrical signals SU, which then proceed to uplink multiplexer 320. Uplink multiplexer 320 then distributes electrical signals SU to the service unit(s) 50 that require(s) receiving these electrical signals. The receiving service units 50 process signals SU, which in an example embodiment includes one or more of: storing the signal information; digitally processing or conditioning the signals; sending the signals on to one or more outside networks 223 via network links 224; and sending the signals to one or more client devices 45 in picocellular coverage area 44.

In an example embodiment, uplink multiplexer 320 and RF signal-directing element 328 therein are controlled by controller 250 via a control signal S2 to direct electrical signals SU to the service unit(s) 50 that require(s) receiving electrical signals SU.

In an example embodiment, the different services from some or all of service units 50 (i.e. cellular phone service, WiFi for data communication, RFID monitoring, etc.) are combined at the RF signal level by frequency multiplexing.

In an example embodiment, a single electrical power line 168 from power supply 160 at central control station 210 is incorporated into optical fiber cable 220 and is adapted to power each transponder 30, as shown in FIG. 6. Each transponder 30 taps off the needed amount of power, e.g., via DC converter 180 (FIG. 2). Since the preferred embodiment of transponder 30 has relatively low functionality and power consumption, only relatively low electrical power levels are required (e.g., ~1 watt), allowing high-gauge wires to be used (e.g., 20 AWG or higher) for electrical power line 168. In an example embodiment that uses many transponders 30 (e.g., more than 12) in optical fiber cable 220, or if the power consumption for transponders 30 is significantly larger than 1 watt due to their particular design, lower-gauge wires or multiple wires are employed in electrical power line 168. The inevitable voltage drop along electrical power line 168 within cable 220 typically requires large-range (~30 volts) voltage regulation at each transponder 30. In an example embodiment, DC power converters 180 at each transponder 30 perform this voltage regulation function. If the expected voltage drop is known, then in an example embodiment controller 250 carries out the voltage regulation. In an alternative embodiment, remote voltage sensing at each transponder 30 is used, but this approach is not the preferred one because it adds complexity to the system.

Centralized System with Multiple Optical Fiber Cables

Figure 8:
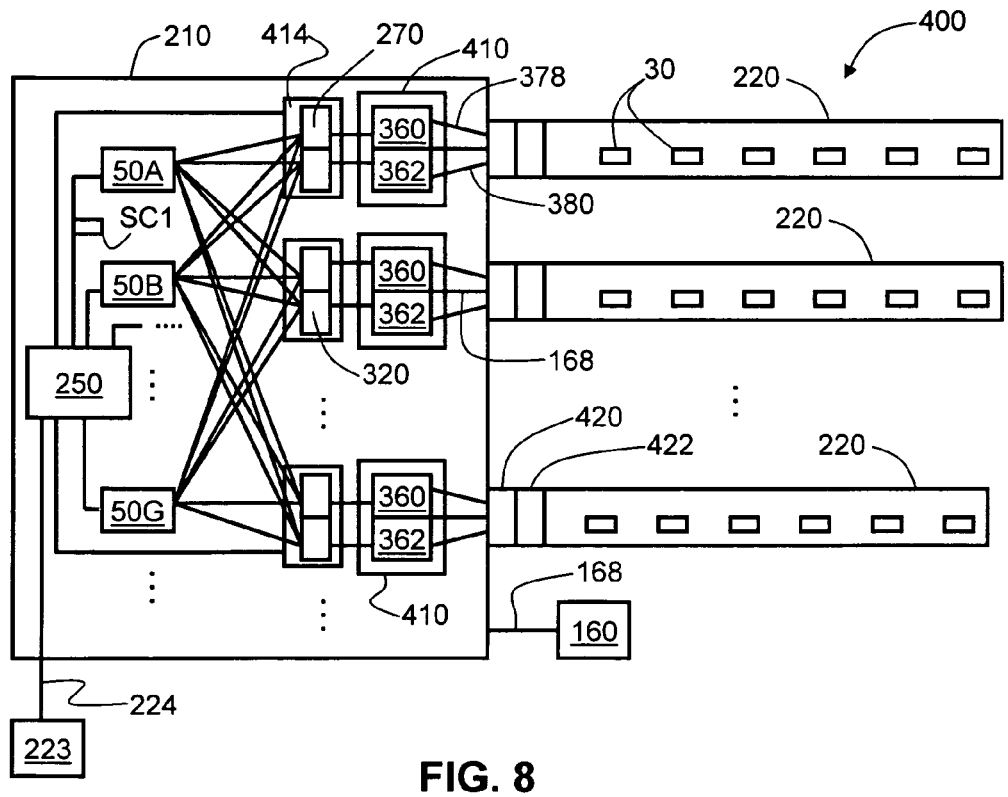
FIG. 8 is a schematic diagram of an example embodiment of an optical-fiber-based picocellular system that includes a central head-end station and multiple optical fiber cables.

FIG. 8 is a schematic diagram of an example embodiment of a centralized optical-fiber-based wireless picocellular system 400 according the present invention. System 400 is similar to system 200 as described above, but includes multiple optical fiber cables 220 optically coupled to central head-end station 210. Central head-end station 210 includes a number of E/O converter arrays 360 and a corresponding number of O/E converter arrays 362, arranged in pairs in converter array units 410, with one converter array unit optically coupled to one optical fiber cable 220. Likewise, system 400 includes a number of downlink multiplexers 270 and uplink multiplexers 320, arranged in pairs in multiplexer units 414, with one multiplexer unit electrically coupled to one converter array unit 410. In an example embodiment, controller 250 is electrically coupled to each multiplexer unit 414 and is adapted to control the operation of the downlink and uplink multiplexers 270 and 320 therein. Here, the term "array" is not intended to be limited to components integrated onto a single chip as is often done in the art, but includes an arrangement of discrete, non-integrated components.

Each E/O converter array 360 is electrically coupled to the downlink multiplexer 270 in the corresponding multiplexer unit 414. Likewise, each O/E converter array 362 is electrically coupled to the uplink multiplexer 320 in the corresponding multiplexer unit 414. Service units 50 are each electrically coupled to both downlink and uplink multiplexers 270 and 320 within each multiplexer unit 414. Respective downlink and uplink optical fiber cables 378 and 380 optically couple each converter array unit 410 to a corresponding optical fiber cable 220. In an example embodiment, central head-end station 210 includes connector ports 420 and optical cables 220 include connectors 422 adapted to connect to the connector ports. In an example embodiment, connectors 422 are MT ("Mechanical Transfer") connectors, such as the UNICAM® MTP connector available from Corning Cable Systems, Inc., Hickory, N.C. In an example embodiment, connectors 422 are adapted to accommodate electrical power line 168 connected to port 420.

Figure 9:
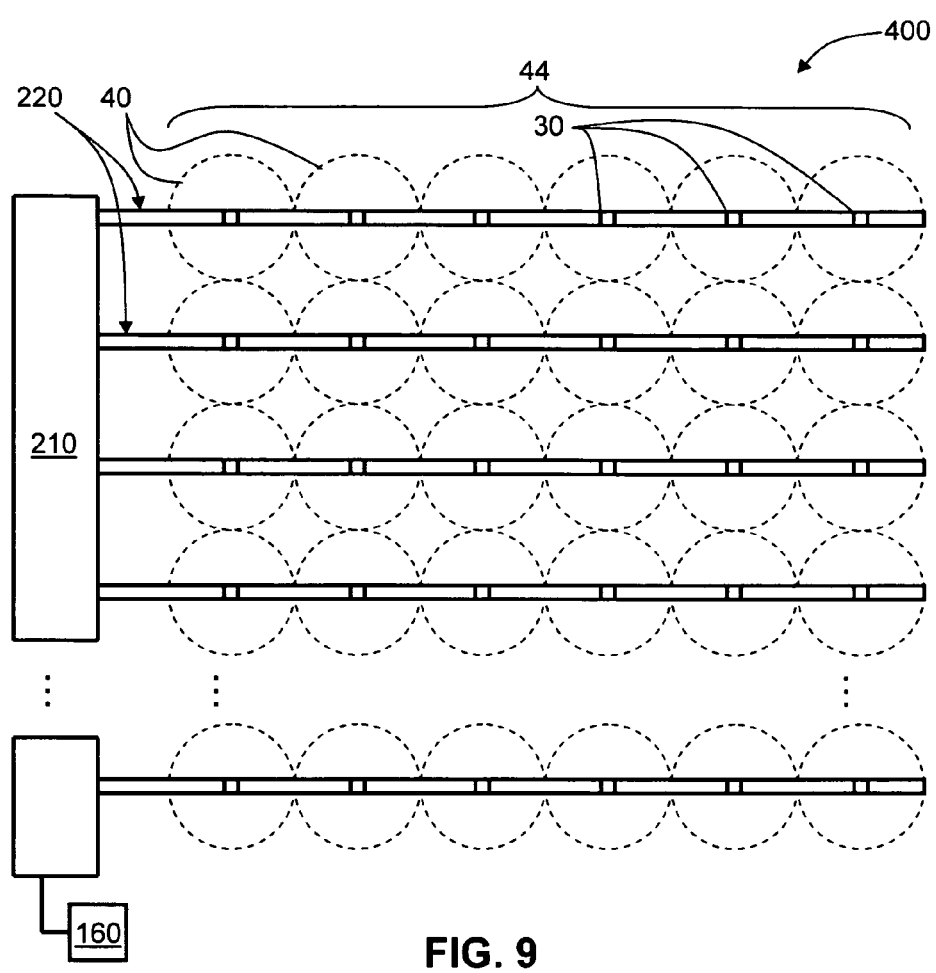
FIG. 9 is a schematic "top-down view" of the system of FIG. 8, illustrating the extended picocell coverage area created by the multiple optical fiber cables.

FIG. 9 is a "top down" view of system 400, showing an extended picocellular coverage area 44 formed by using multiple optical fiber cables 220. In an example embodiment, system 400 supports anywhere from two transponders 30, to hundreds of transponders, to even thousands of transponders. The particular number of transponders employed is not fundamentally limited by the design of system 400, but rather by the particular application.

In FIG. 9, picocells 40 are shown as non-overlapping. This non-overlap is based on adjacent transponders operating at slightly different frequencies to avoid the otherwise undesirable substantial overlap that occurs between adjacent picocells that operate at the same frequency. Same-frequency overlap is discussed in greater detail below in connection with embodiments of the present invention that combine two or more picocells.

Method of Operation

System 400 operates in a manner similar to system 200 as described above, except that instead of transponders 30 being in a single optical fiber cable 220 they are distributed over two or more optical fiber cables through the use of corresponding two or more converter array units 410. Electrical signals SD from service units 50 are distributed to each multiplexer unit 414. The downlink multiplexers 270 therein convey electrical signals SD to one, some, or all of the converter array units 410, depending on which transponders are to be addresses by which service unit. Electrical signals SD are then processed as described above, with downlink optical signals SD' being sent to one, some or all of transponders 30. Uplink optical signals SU' generated by client devices in the corresponding picocells 40 return to the corresponding converter units 410 at central head-end station 210. The optical signals SU' are converted to electrical signals SU at the receiving converter unit(s) 410 and are then sent to the uplink multiplexers 320 in the corresponding multiplexer unit(s) 414. Uplink multiplexers 320 therein are adapted (e.g., programmed by controller 250) to direct electrical signals SU to the service unit(s) 50 that require(s) receiving electrical signals SU. The receiving service units 50 process signals SU, which as discussed above in an example embodiment includes one or more of: storing the signal information; digitally processing or conditioning the signals; sending the signals on to one or more outside networks 223 via network links 224; and sending the signals to one or more client devices 45 in picocellular coverage area 44.

Centralized System for a Building Infrastructure

Figure 10:
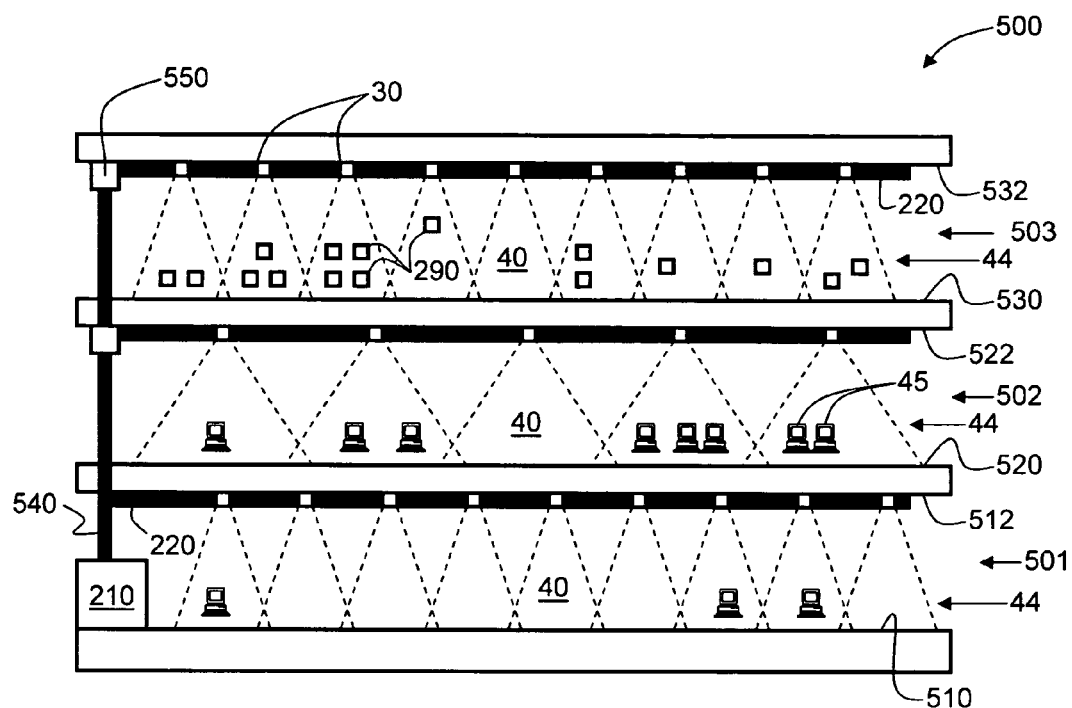
FIG. 10 is a cut-away view of a building infrastructure illustrating an example embodiment wherein the optical-fiber-based wireless picocellular system of the present invention is incorporated into the building infrastructure.

FIG. 10 is a schematic cut-away diagram of a building infrastructure 500 that generally represents any type of building in which the optical-fiber-based wireless picocellular system of the present invention would be useful, such as office buildings, schools, hospitals, college buildings, airports, warehouses, etc. Building infrastructure 500 includes a first (ground) floor 501, a second floor 502, and a third floor 503. First floor 501 is defined by a floor 510 and a ceiling 512, second floor 502 is defined by a floor 520 and a ceiling 522, and third floor 503 is defined by a floor 530 and a ceiling 532. An example centralized optical-fiber-based wireless picocellular system 400 is incorporated into building infrastructure 500 to provide a picocellular coverage area 44 that covers floors 501, 502 and 503.

Figure 11:
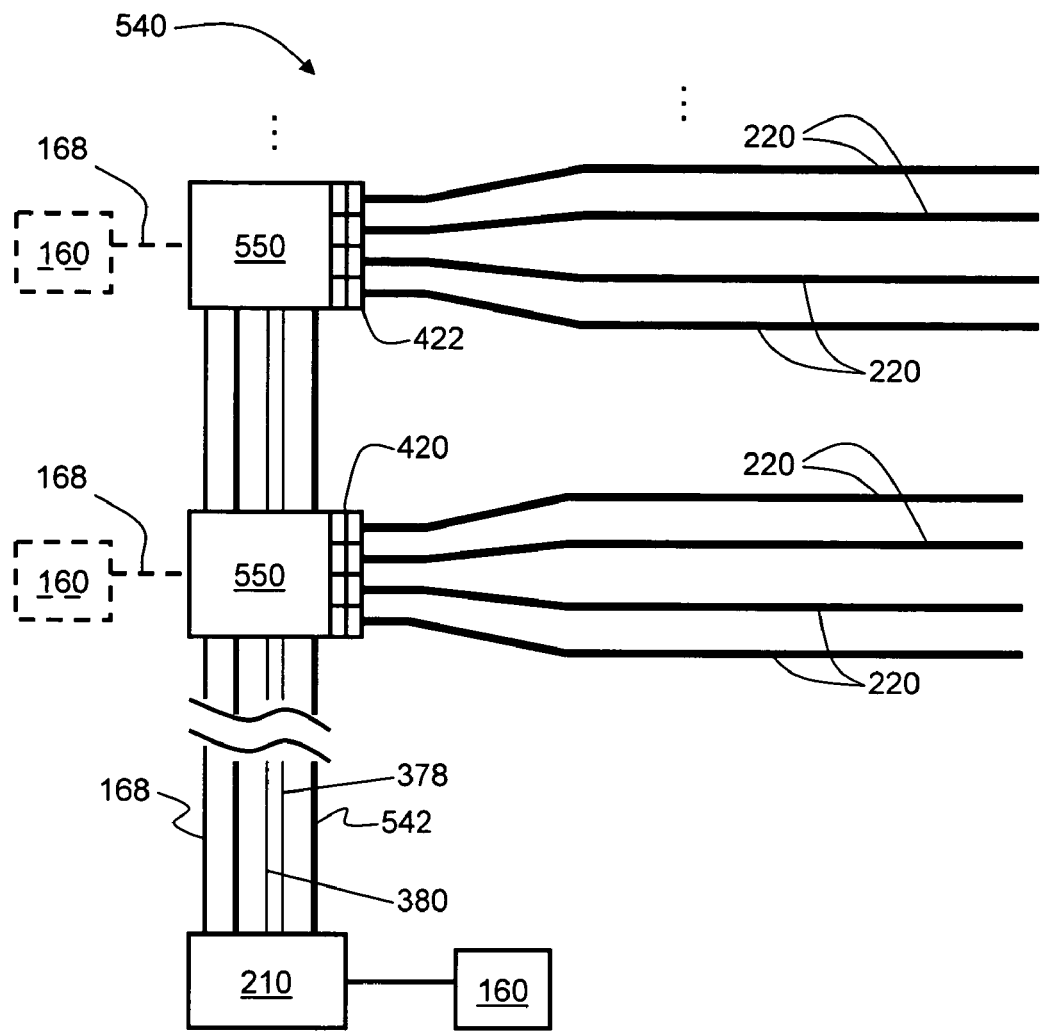
FIG. 11 is a schematic diagram of an example embodiment of a multi-section cable used in the system of FIG. 10 to distribute the transponders throughout the building infrastructure.

In an example embodiment, system 400 includes a main cable 540 having a number of different sections that facilitate the placement of a large number of transponders 30 in building infrastructure 500. FIG. 11 is a schematic diagram of an example embodiment of main cable 540. Cable 540 includes a riser section 542 that carries all of the uplink and downlink optical fiber cables 378 and 380 (FIG. 8) from central head-end station 210. Cabling 540 includes one or more multi-cable (MC) connectors 550 adapted to connect select downlink and uplink optical fiber cables 378 and 380, along with electrical power line 168, to a number of optical fiber cables 220. In an example embodiment, MC connectors 550 include individual optical fiber cable ports 420 and optical fiber cables 220 include matching connectors 422. In an example embodiment, riser section 542 includes a total of seventy-two downlink and seventy-two uplink optical fibers 136D and 136U, while twelve optical fiber cables 220 each carry six downlink and six uplink optical fibers.

Main cable 540 enables multiple optical fiber cables 220 to be distributed throughout building infrastructure 500 (e.g., fixed to ceilings 512, 522 and 532) to provide an extended picocellular coverage area 44 for the first, second and third floors 501, 502 and 503. An example type of MC connector 550 is a "patch panel" used to connect incoming and outgoing optical fiber cables in an optical telecommunication system.

In an example embodiment of multi-section cabling 540, electrical power line 168 from power supply 160 runs from central head-end station 210 through riser section 542 and branches out into optical fiber cables 220 at MC connectors 550. In an alternative example embodiment, electrical power is separately supplied at each MC connector 550, as indicated by the dashed-box power supplies 160 and dashed-line electrical power lines 168.

In an example embodiment, central head-end station 210 and power supply 160 is located within building infrastructure 500 (e.g., in a closet or control room), while in another example embodiment it is located outside of the building at a remote location.

Figure 12:
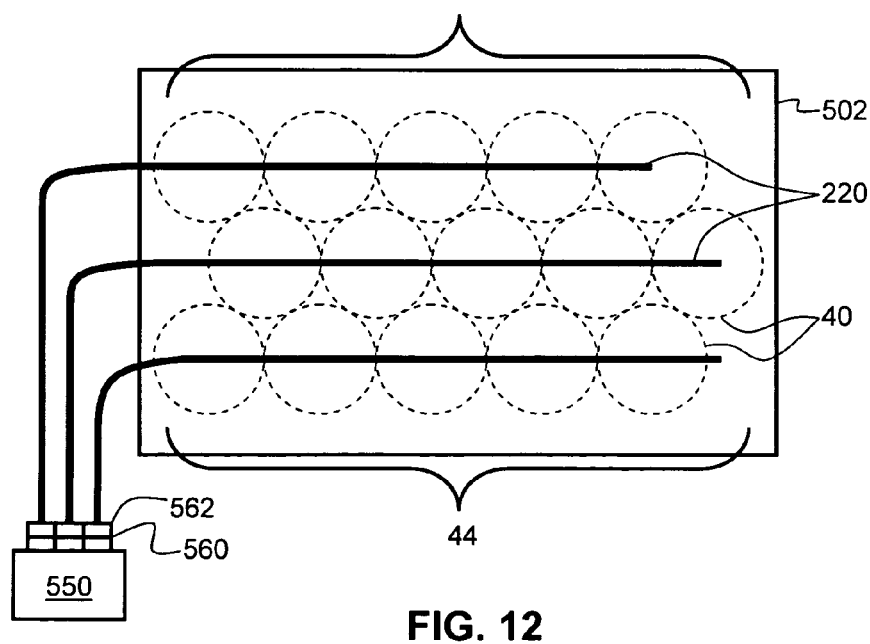
FIG. 12 is a schematic plan view of the second floor of the building infrastructure of FIG. 10, illustrating how three optical fiber cables branch out from the multi-cable connector to create an extended picocellular coverage area for the second floor.

An example embodiment of the present invention involves tailoring or designing the picocellular coverage areas 44 for the different floors to suit particular needs. FIG. 12 is a schematic "top down" view of the second floor 502 of building infrastructure 500, showing three optical fiber cables 220 branching out from MC connector 550 and extending over ceiling 522. Picocells 40 associated with transponders 30 (not shown in FIG. 12) form an extended picocellular coverage area 44 that covers second floor 502 with fewer, larger picocells than the first and third floors 501 and 503 (FIG. 10). Such different picocellular coverage areas 44 may be desirable when the different floors have different wireless needs. For example, third floor 503 might require relatively dense picocell coverage if it serves as storage for items that need to be inventoried and tracked via RFID tags 290 (FIG. 4), which in the present invention can be considered simple client devices 45. Likewise, second floor 502 may be office space that calls for larger and fewer picocells to provide cellular phone service and WLAN coverage.

Figure 13:
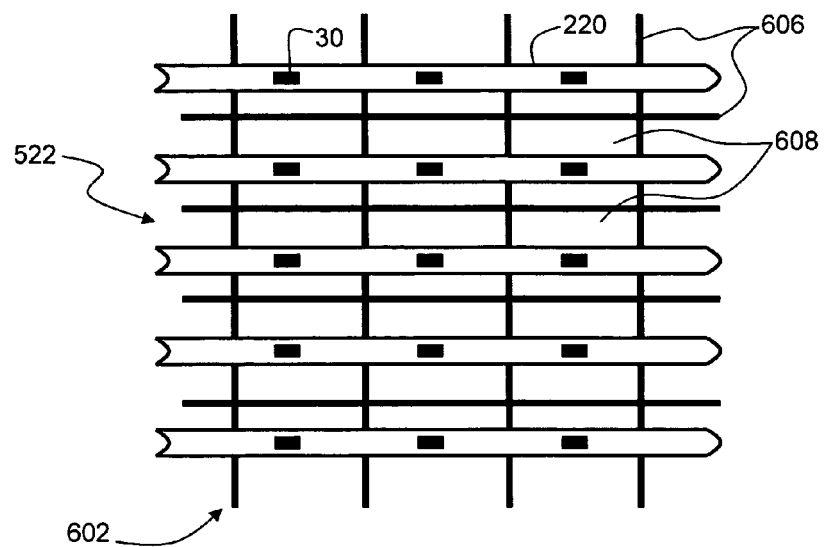
FIG. 13 is a top-down view of an example optical fiber cable system as part of an optical-fiber-based wireless picocellular system, wherein the optical fiber cables are arranged above the suspended ceiling of the building infrastructure shown in FIG. 10.
Figure 14:
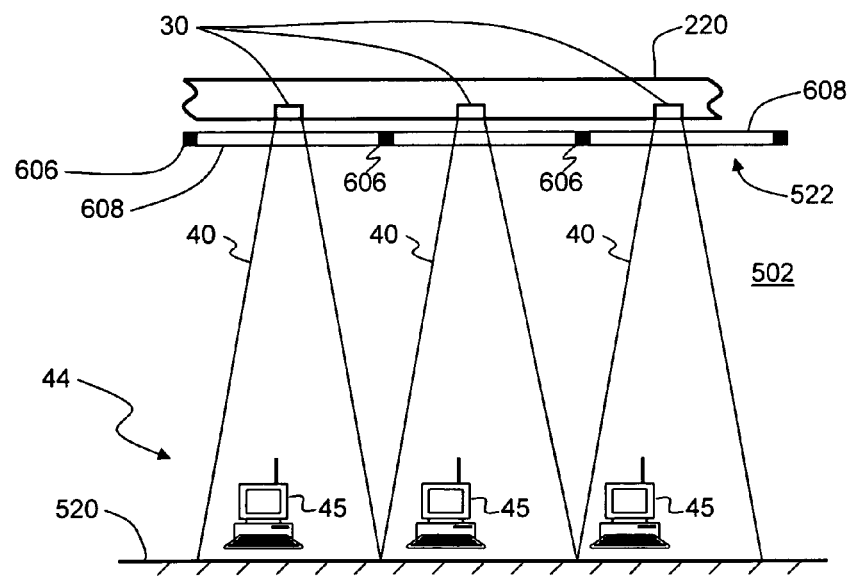
FIG. 14 is a side view of the optical fiber cable system as shown in FIG. 13, illustrating the formation of the picocells by each transponder to form a picocellular coverage area within the room.

FIG. 13 is a top-down view of an example optical fiber cable system that includes a number of optical fiber cables 220 as part of an optical-fiber-based wireless picocellular system such as system 400, wherein the optical fiber cables are arranged between floor 520 and ceiling 522 (FIG. 10) to provide picocellular coverage in room 502. In the example of FIG. 13, ceiling 522 is a drop ceiling having a frame 602 with conducting (e.g., metal) cross members 606 that support ceiling tiles 608. FIG. 14 is a side view of the optical fiber cable system as shown in FIG. 13, illustrating the formation of picocells 40 in room 502 by each transponder 30 to form a picocellular coverage area 44 within the room.

Centralized Wireless Picocellular System with Combined Picocells

In the various example embodiments of wireless picocellular systems described above, the one or more client devices 45 communicate with central head-end station 210 via the individual picocells 40 in which the client devices are located. Each picocell 40 handles only that "traffic" associated with client devices within its own picocell, thereby maximizing the bit rate per picocell to the full theoretical maximum as supported by the technology at central head-end station 210 (i.e. 54 Mb/s for the 802.11a IEEE Standard). This is the so-called "single-input/single-output or "SISO" method that is typically used in wireless picocellular systems.

However, most client devices 45 can easily detect signals from the antenna systems 100 of the transponders 30 that form neighboring picocells 40. A goal of a wireless picocellular system is to provide a high bit rate by having a high signal-to-noise (SNR) within each picocell. This is achieved by having a relatively short distance between a given client device 45 and the closest antenna system 100. However, since picocells 40 are formed by transponders 30 each having a single antenna system 100 for transmission and reception per picocell, and because different channel frequencies are used for adjacent picocells to avoid overlap (interference), it is not possible to exploit antenna spatial diversity methods. This is unfortunate, since spatial diversity is an attractive method for counteracting adverse effects, such as signal fading, that are inherent in the wireless transmission process. It is generally desirable to overcome such inherent shortcomings and improve the performance of a wireless picocellular system, such as by increasing the data rate, improving the SNR and increasing the transmission distance—preferably without having to increase the transmission power of the transponder antenna systems or making substantial changes to the system hardware and/or infrastructure.

An aspect of the present invention improves the performance capabilities of conventional wireless picocellular systems that use individual picocells formed by single-antenna transponders by combining one or more groups of two or more neighboring picocells to form corresponding one or more larger picocells, each of which is referred to hereinafter as a "combined picocell."

Several example embodiments of systems for and methods of forming one or more combined picocells are described below. The systems and methods described below do not require making significant changes to the infrastructure or hardware of the wireless picocellular system, which in practice may already exist. The combined picocells are preferably formed via operations carried out at the central head-end station 210 based on an existing wireless picocell system infrastructure that includes two or more single-antenna transponders.

An aspect of the present invention is an "upgrade path" that provides enhanced performance capability for an existing picocellular infrastructure with transponders having single antennas. Alternatively, transponders with multiple antennas could be used to achieve similar gains from applying techniques that take advantage of multiple antenna systems. Also, the techniques of forming combined picocells as discussed below can be applied to picocellular systems with transponders that have two or more antennas. However, multiple antennas require multiple RoF paths to the central head-end station. This in turn requires additional E/O converters and optical fiber communication links, which greatly add to the system cost. While wavelength-division multiplexing (WDM) can be used to avoid adding additional optical fiber links, WDM multiplexers and demultiplexers are required, which still add to system cost and complexity. The "cell-bonding" approach of the present invention allows for using the existing RoF wireless picocellular system infrastructure to achieve multi-antenna gain performance without having to install additional optical fiber communication links or WDM-related hardware.

In an example embodiment, the systems and methods of forming one or more combined picocells includes making modifications to the different embodiments of the central head-end stations described above so that they can perform the appropriate type of signal processing for the particular approach used. The modifications may include hardware and/or software changes so that the central head-end station can carry out the necessary steps for implementing the particular method.

Each example embodiment described below takes advantage of the otherwise disadvantageous property of the substantial overlap that occurs between adjacent picocells that operate at the same (i.e., a common) frequency. In an example embodiment, the amount of picocell overlap (and thus the size of the combined picocell) is adjusted by changing the antenna power level of the transponder. Often, an optimum amount of overlap is desirable and is associated with a corresponding antenna power level. Likewise, overlap between neighboring combined picocells is reduced by using different frequencies for neighboring combined picocell, while using a common frequency for the transponders within a given combined picocell.

With reference to the wireless picocellular system of FIG. 2 and as discussed above, head-end unit 20 therein represents a generalized form of a central head-end station 210 such as shown in wireless picocellular system 200 of FIG. 5 and system 400 of FIG. 8. In an example embodiment, the common-frequency RF signals provided to the transponders 30 that make up a combined picocell are provided by one or more of service units 50. As mentioned above, the different frequencies associated with the different signal channels are created by modulator/demodulator unit 70 generating different RF carrier frequencies based on instructions from CPU 74. Likewise, when forming combined picocells, CPU 74 instructs modulator/demodulator 70 to generate a common RF carrier frequency for those RF signals to be sent to the transponders 30 making up a given combined picocell. In an example embodiment, the information as to which transponders 30 form a given combined picocell is provided by controller 250, e.g., by CPU 252 therein.

Because a combined picocell has associated therewith two or more transponders, performance improvements can be realized by advantageous use of the two or more transponder antenna systems. Accordingly, the various example systems and methods described immediately below represent different approaches to forming one or more combined picocells having enhanced performance capability, as compared to an individual picocell that utilizes a transponder having a single antenna system.

Antenna Diversity System and Method

Unlike most WLAN systems that have access points distributed throughout the deployment area and connected in the backbone by baseband data transmission channels, wireless picocellular systems based on RoF transmission are not easily adapted to exploit antenna diversity because only single antennas are typically supported by each transponder. As discussed above, supporting additional antennas would require additional fiber channels, which adds substantially to overall system cost. At the same time, the different frequencies used for adjacent transponders in neighboring cells prevent a client device 45 in one picocell 40 from communicating with the antenna system 100 associated with the adjacent picocell on short time scaled (e.g., data-packet time scales of microseconds or milliseconds).

Figure 15:
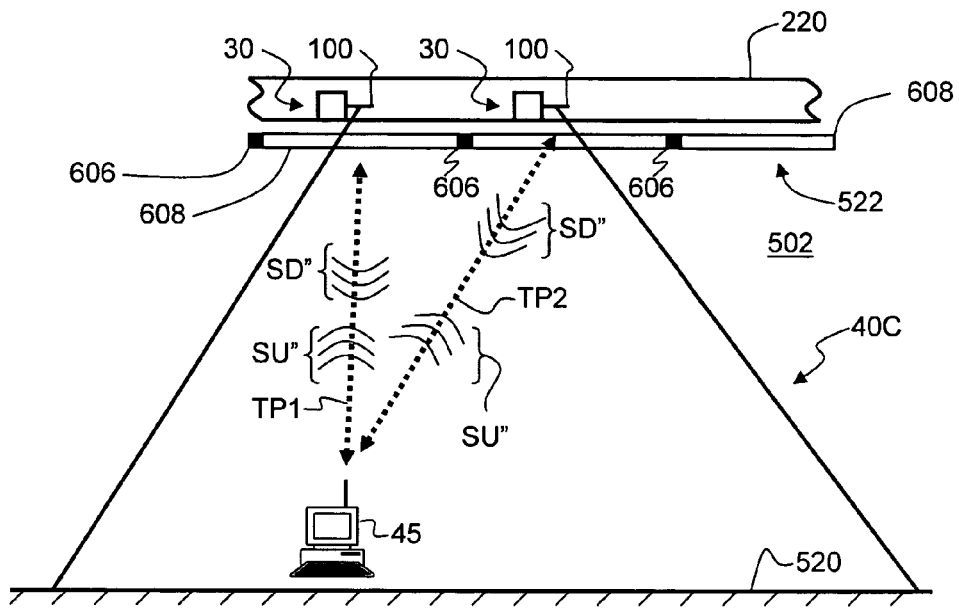
FIG. 15 is a schematic diagram similar to FIG. 14, showing two adjacent (neighboring) transponders and their respective antenna systems, and illustrating the formation of a combined picocell from the two neighboring transponders, and further illustrating the two choices of signal transmission paths associated with the system's antenna diversity capability.

Accordingly, an example embodiment of the present invention includes a wireless picocellular system, such as the ones described above, wherein central head-end station 210 is adapted to form one or more combined picocells 40C from one or more groups of adjacent picocells 40, such as illustrated in FIG. 15.

In an example embodiment such as illustrated in FIG. 15, one or more groups of two or more picocells 40 are combined to form corresponding one or more combined picocells 40C via the operation of central head-end station 210. In particular, controller 250 in central head-end station 210 (see FIG. 5 or FIG. 8) causes one or more of service units 50 to generate an electrical downlink signals SD. In an example embodiment, controller 250 also uses control signal S1 to direct RF signal-directing element 280 in downlink signal multiplexer 270 to send the downlink signal to a select one of the two or more transponders 30 for the picocells to be combined for the combined picocell 40C, while ensuring that each transponder in the combined picocell receives a signal having the same frequency.

Note that in the antenna diversity approach, the downlink signal is not sent to the transponders 30 simultaneously. Rather, the downlink signal is sent to a select transponder 30—namely, the one having the greatest antenna signal strength at the client location. On the other hand, the uplink signal sent from each client device 45 is sent simultaneously to all transponders 30 in the combined picocell 40C. For uplink transmission, the two or more signals received by transponders 30 are simultaneously sent back to the central head-end station, which decides which signal to select. This decision is made based on the greatest received signal strength. The selected signal is either processed by central head-end station 210 (e.g., in one or more service units 50), or passed on to an outside network 223 (FIG. 2). The transponder that provides the highest uplink signal strength is typically also selected for downlink signal transmission since it is assumed that the reverse channel is similar for a short time period. Communication between client device 45 and central head-end station 210 switches between transponders 30 as the respective antenna signal strengths change, e.g., due to fading of the wireless channel. Thus, in the antenna diversity approach, the downlink signals are provided "non-simultaneously" to the corresponding transponders 30, meaning that they are provided to one transponder at a time.

Figure 16:
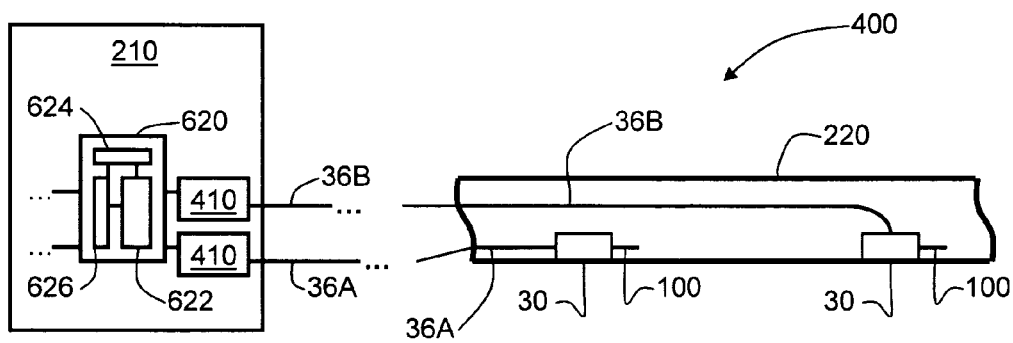
FIG. 16 is a schematic diagram based on FIG. 8 that illustrates an example embodiment of the central head-end unit having a diversity selector operably arranged therein to provide antenna diversity to one or more combined picocells such as the two-transponder combined picocell shown in FIG. 15.

FIG. 16 is a simplified schematic diagram of wireless picocellular system 400 of FIG. 8, showing central head-end station 210 as including a diversity selector 620 electrically coupled to converter array units 410. Transponders 30 that are associated with a combined picocell 40C are optically coupled to respective converter array units 410 at central head-end station 210 via respective optical fiber communication links 36A and 36B.

In an example embodiment, diversity selector 620 includes a power detector 622, power-selecting logic electronics 624 operably coupled thereto, and an RF switch 626 operably coupled to (or directly including) the power-selecting electronics and, if necessary, to power detector 622. Diversity selector 620 detects the uplink signal strengths of uplink signals sent by the transponders 30 making up the combined picocell 40C via power detector 622 and compares the received signal strengths in power-selecting electronics 624. Power-selecting electronics selects (identifies) the uplink signal having the greatest strength. RF switch 626 then passes the greatest-strength uplink signal to one or more of the service units 50 (FIG. 8). This signal is then used for further signal processing or is passed on to an outside network.

Central head-end station 210 then addresses (with downlink signals) the transponder 30 associated with the greatest-strength uplink signal. This is accomplished by central head-end station 210 selecting (e.g., via RF switch 626) the appropriate uplink path (e.g., uplink optical fiber 136U in optical fiber communication link 36A or 36B (FIG. 2)) for the given "optimum" transponder in the group of two or more transponders associated with combined picocell 40C.

With combined picocell 40C so formed, each client device 45 residing within the combined picocell can communicate with either one of the two antenna systems 100 of transponders 30 that form the combined picocell. The particular uplink and downlink signal transmission paths TP1 or TP2 used to communicate with client device(s) 45 via electromagnetic downlink signals SD" and electromagnetic uplink signals SU" from antenna systems 100 depend on which antenna system has the stronger signal, e.g., as determined by diversity selector 620.

The introduction of antenna diversity into the wireless picocellular system through central head-end station 210 leads to improved performance capability (including higher data throughout and reduced signal fading) due to diversity gain without the need to make substantial changes to the system infrastructure or hardware.

Antenna diversity is typically associated with relatively short signal-fading time scales, usually in the millisecond range. Thus, a new signal transmission path can be selected for each new data packet in a given downlink wireless transmission. This has limited effect on client-device roaming between combined picocells, which generally occurs at longer-term average power changes (e.g., seconds).

Phased-Array Antenna Network System and Method

Another example embodiment of forming one or more combined picocells 40C in a wireless picocellular system includes forming a phased-array antenna network based on the antenna systems 100 of the transponders 30 associated with the combined picocell. The systems and methods for this approach are similar to the antenna diversity systems and methods discussed above in that the same frequency uplink and downlink signals are used for the transponders that form the combined picocell. However, rather than client device 45 communicating over a single signal transmission path with the one transponder 30 having the strongest antenna signal, the client device communicates with each transponder 30 simultaneously over multiple transmission paths, with the two or more antenna systems of the transponders operating collectively as a phased-array antenna network. Likewise, in contrast to the antenna diversity approach, the central head-end station 210 provides the downlink signal simultaneously to each of the transponders 30 associated with combined picocell 40C, while applying the appropriate phase shift for each transponder. Note that in an example embodiment, appropriate amplitude adjustments are also made for each transponder and are applied on either the uplink or downlink, or both, so that the phased-array antenna network further operates as an adaptive-array antenna network, such as with maximal ratio combining.

Figure 17:
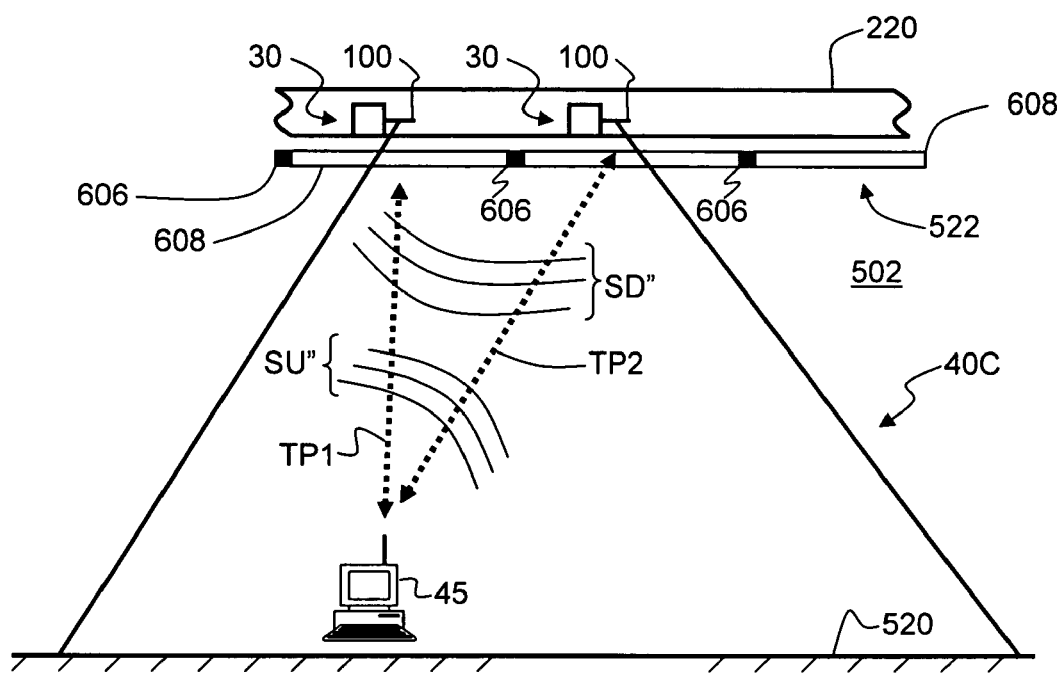
FIG. 17 is a schematic diagram similar to FIG. 15, illustrating how the antenna systems of each transponder associated with the combined picocell are operated together as a phased-array antenna network for communicating with a client device residing within the combined picocell.

Thus, with reference to FIG. 17, one or more client devices 45 residing within combined picocell 40C (only one client device 45 is shown for illustration) simultaneously communicates with antenna systems 100 of combined picocell transponders 30 via electromagnetic downlink and uplink signals SD" and SU". These signals travel along both signal transmission paths TP1 and TP2 and thus to both antenna systems 100.

In an example embodiment, two or more picocells 40 are combined to form combined picocell 40C by one or more of service units 50 generating corresponding two or more copies of an electrical downlink signal SD. In an example embodiment, modulator/demodulator unit 70 in a given service unit 50 (FIG. 2) adjusts the respective phase of the two or more electrical downlink signal copies so that when they are transmitted by the two or more antenna systems 100, they not only have the same frequency but constructively interfere at client device 45 to maximize the received power, hence SNR.

In an example embodiment, controller 250 also uses control signal S1 to direct RF signal-directing element 280 in downlink signal multiplexer 270 to send the phase-shifted copies of the downlink signals SD to the corresponding combined-picocell transponders 30. In an example embodiment, the phases imparted to the electrical downlink signals are optimized empirically, e.g., by varying the phases and measuring the signal strength from the particular client device 45, whose location determines the required signal phases.

A combined picocell that utilizes a phased-array antenna network results in an improved signal-to-noise ratio, which allows for higher bit rates. Although such systems and methods do not increase the maximum bit rate supported by the standard, they do minimize the amount of area within the picocell coverage area subject to a reduced bit rate because of low signal strength, i.e. SNR. This is useful for indoor environments, which are anticipated to be a widely used application of wireless picocellular systems.

MIMO System and Method

Another example embodiment of forming one or more combined picocells 40C for a wireless picocellular system includes forming a multiple-input/multiple-output (MIMO) antenna system from two or more transponder antenna systems 100 for use in combination with a client device 45 having two or more antennas and MIMO capability. An example embodiment of a client device 45 having multiple antennas and MIMO capability is a laptop computer with a multiple-antenna MIMO wireless card.

Figure 18:
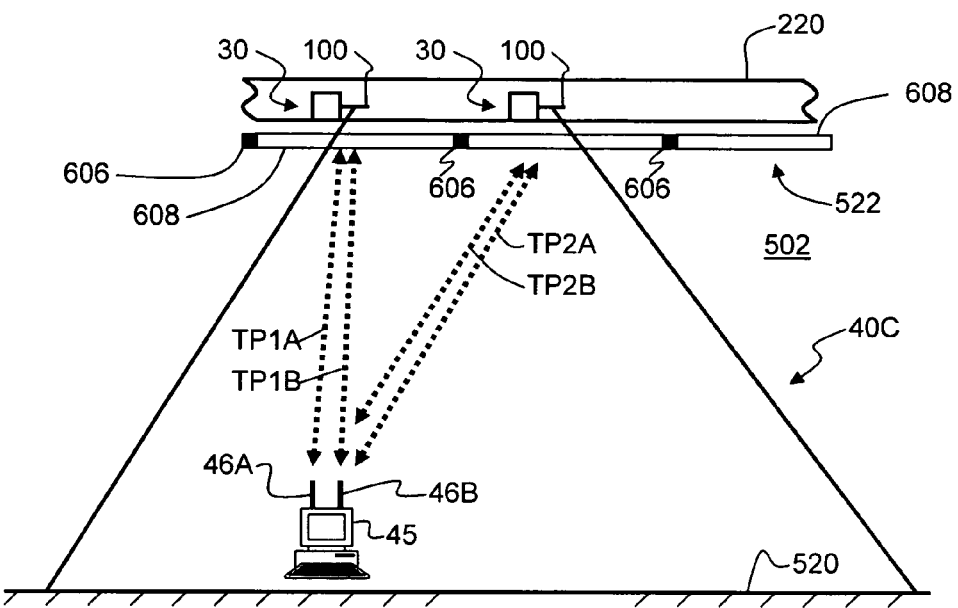
FIG. 18 is a schematic diagram similar to FIG. 15 and FIG. 17, illustrating the signal transmission paths between the transponder antenna systems and the multiple antennas of a client device in performing MIMO transmission between the central head-end station and the client device.

FIG. 18 is a schematic diagram similar to FIG. 17, showing a client device 45 having two antennas 46A and 46B residing within an example combined picocell 40C formed by two neighboring transponders 30. Communication between client device 45 and the two antenna systems 100 of the two transponders 30 takes place within combined picocell 40C simultaneously over four signal transmission paths labeled as TP1A, TP1B, TP2A and TP2B.

The arrangement shown in FIG. 18 illustrates a "2×2" MIMO configuration having two (2) transmitting antennas and two (2) receiving antennas. Other "X×Y" MIMO configurations, such as 1×2, 2×1, 2×3, 3×2, 3×3 3×4, 4×3, 4×4, etc., are also available in the present invention, depending on the number of picocells 40 combined to form combined picocell 40C and the number of antennas available on the particular client device 45.

In an example embodiment of the wireless picocellular system of the present invention such as shown in FIG. 18, two or more picocells 40 are combined to form a combined picocell 40C. This is accomplished by controller 250 in central head-end station 210 (e.g., FIG. 5 or FIG. 8) causing one or more of service units 50 to generate an electrical downlink signal SD.

Generally speaking, electrical downlink signal SD and corresponding electrical uplink signal SU are in the form of bit streams. For MIMO applications, each transponder antenna and each client antenna serves as both transmitting and receiving antennas that transmit bit-stream segments and receive bit stream segments. Alternatively, there can be separate antennas for transmitting and receiving. For uplink MIMO communication, each antenna system 100 receives the various portions of the entire electromagnetic uplink signal SD" (i.e., the bit stream segments) transmitted by each transmitter antenna 46A and 46B so that a jumbled bit stream is received at each receiver antenna. Likewise, for downlink MIMO communication, each antenna 46A and 46B receives the various portions of the electromagnetic downlink signal SD" (i.e., the bit stream segment) transmitted from each transmitter antenna system 100. Thus, central head-end station 210 provides the downlink signal SD simultaneously to the different transponders 30, though the downlink signal bit stream is divided up among the transponders according to the MIMO signal processing. Likewise, the client device simultaneously transmits the uplink signal bit streams to the different antenna systems 100, though the uplink signal bit stream is divided up among the client device antennas according to the MIMO signal processing.

In an example embodiment, one or more service units 50 is/are adapted to perform MIMO signal processing of the electrical downlink and uplink signal bit streams by carrying out mathematical algorithms that properly divide a given downlink bit stream signal into the separate downlink bit stream signals for each antenna to achieve MIMO gain. Likewise, the one or more service units 50 is/are adapted to properly recombine the otherwise jumbled uplink signal bit streams received by each antenna system 100. Client device 45 also has MIMO signal processing capability so that it can communicate with antenna systems 100 using MIMO techniques.

An example MIMO signal processing approach suitable for use in the present invention is discussed, for example, in the article by Arogyaswami et al., entitled "An overview of MIMO communications—a key to gigabit wireless," Proceedings of the IEEE, Vol. 92, No. 2, February 2004, which article is incorporated by reference herein.

Figure 19:
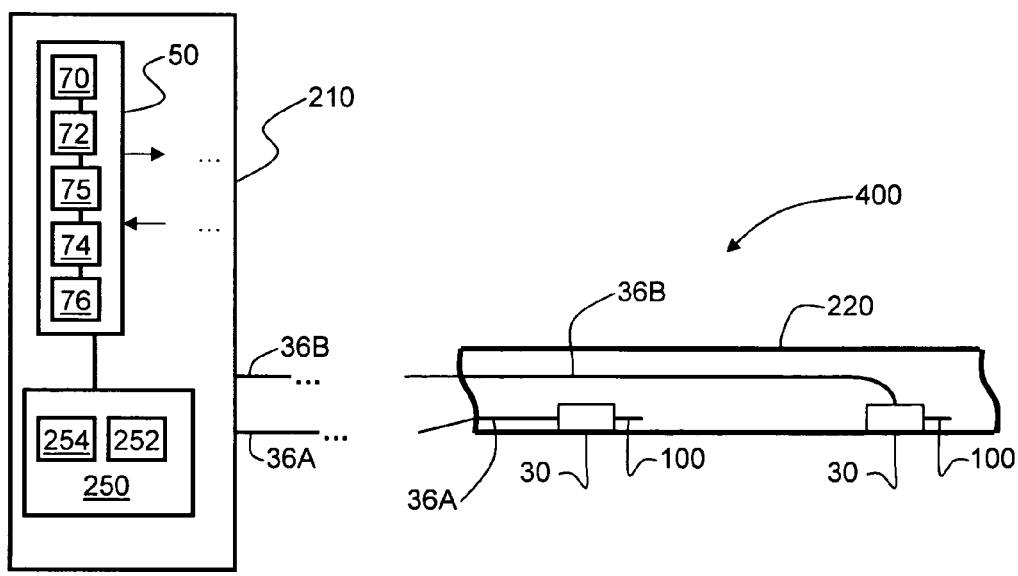
FIG. 19 is a schematic diagram similar to FIG. 16 and FIG. 2 that illustrates an example embodiment wherein a service unit in the central head-end station has a MIMO chip that provides the central head-end station with MIMO signal processing capability.

FIG. 19 is a schematic diagram of an example embodiment of a wireless picocellular system 400 similar to FIG. 16 and to FIG. 2 that illustrates an example embodiment wherein a service unit 50 in central head-end station 210 includes a MIMO chip 75. MIMO chip 75 is operably coupled to CPU 74 and digital signal processor 72 in service unit 50 and is adapted to perform the aforementioned MIMO signal processing. An example MIMO chip 75 suitable for use in the present invention is a 802.11n-compatible MIMO chip, such as is available from Broadcom, Inc., Irvine, Calif., as part number BCM2055

In an example embodiment, controller 250 uses control signal S1 to direct RF signal-directing element 280 in downlink signal multiplexer 270 (FIG. 5) to send the same-frequency MIMO downlink signals (bit streams) to the corresponding two or more transponders 30 that form combined picocell 40C.

By using the MIMO method, independent downlink and uplink signals (bit streams) are transmitted from two or more antennas, which leads to an improvement of the bit rate of up to N times, where N is the smaller of either the number of transponder antenna systems 100 used or client antennas 46 used. The MIMO method allows picocellular wireless systems employing single-antenna transponders to satisfy the higher data transmission rates anticipated by future wireless communication standards, such as IEEE wireless communication standards (e.g., IEEE 802.11n).

Unique Applicability to Wireless Picocellular Systems

The above-described example methods for combining picocells to form one or more combined picocells relies on the two or more transponder antenna systems being relatively close to each other—say, from centimeters apart to up to ~10 meters apart. These distances are consistent with those used in wireless picocellular systems. Simulations and measurements carried out by the present inventors have shown that the principle of combining antennas in the aforementioned separation range indeed works and improves performance of wireless picocellular systems.

The simulations and measurements carried out by the inventors also revealed that larger antenna separations (i.e., significantly beyond 10 meters) actually reduce wireless picocellular system performance based on cell combining techniques. Accordingly, the above-described methods of improving the performance of wireless picocellular systems are inapplicable to typical WLAN system installations with large cell sizes from 50 m to 100 m because such systems have antenna separations significantly larger than those associated with picocellular wireless systems Picocellular Coverage Using Combined Picocells An aspect of the wireless picocellular system of the present invention includes restructuring an existing picocellular coverage area 44 formed from an array of picocells 40, such as shown in FIG. 9, by forming one or more combined picocells 40C from two or more of the (individual) picocells.

Figure 20:
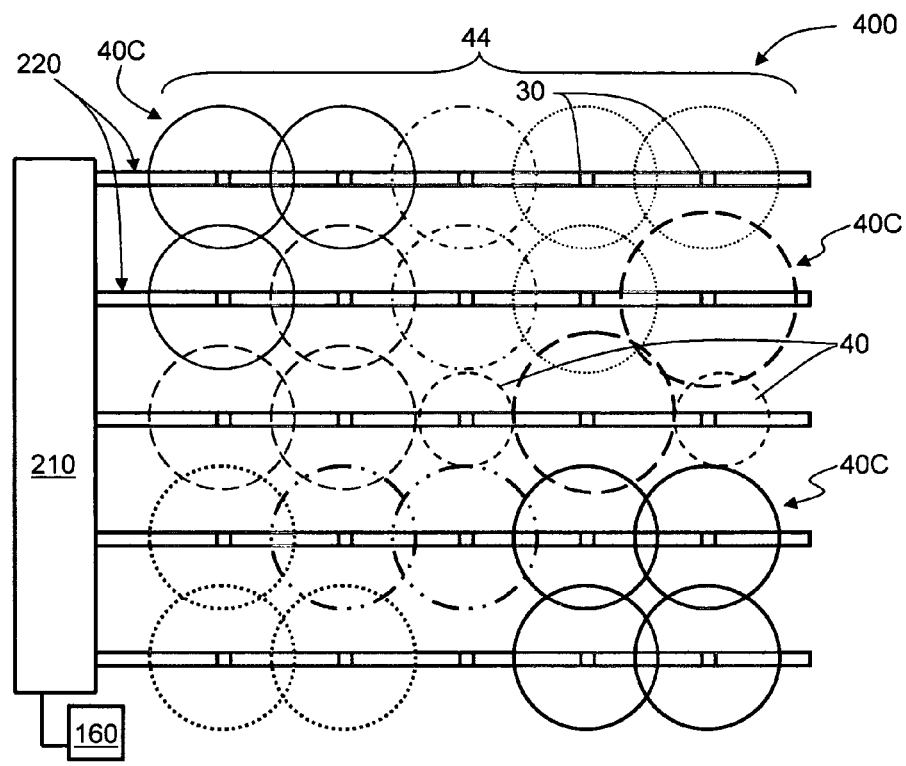
FIG. 20 is a schematic diagram similar to FIG. 9, showing the restructuring of the picocell coverage area of FIG. 9 formed by an array of individual picocells to include a number of combined picocells.
Figure 21:
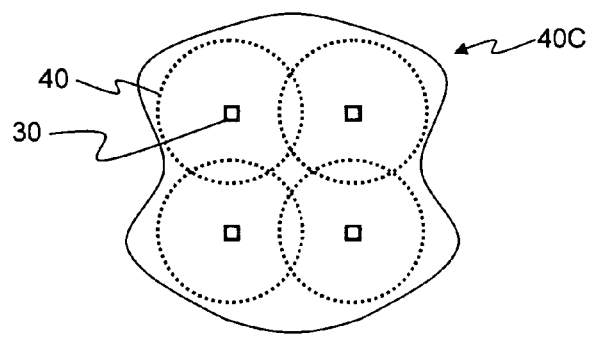
FIG. 21 is a schematic diagram that illustrates an example boundary of a combined picocell based on combining four picocells, wherein the combined picocell boundary represents the distance at which the combined antenna power is uniformly low.

FIG. 20 is a schematic diagram similar to FIG. 9, but showing a number of combined picocells 40C formed, for example, by using any of the above-described picocell-combining systems and methods to restructure all but two of the existing picocells 40. In FIG. 20, the picocells 40 that make up a given combined picocell 40C have the same line type (i.e., solid, short-dashed, dot-dashed, etc.). In an example embodiment, the picocell area of a combined picocell 40C is substantially the sum of the areas of the individual picocells that make up the combined picocell. This is illustrated in FIG. 21, which schematically illustrates an example of a "boundary" B of a combined picocell 40C based on combining four picocells 40. As with an individual picocell boundary, the combined picocell boundary B is not actually an abrupt edge, but is a schematic representation of a distance where the combined antenna power is uniformly low.

In FIG. 20 there are the two picocells 40 that remain uncombined with any other picocells. The two uncombined picocells 40 are shown as substantially non-overlapping with the adjacent combined picocells 40C to indicate that these picocells 40 remain uncombined and use a frequency different from the surrounding combined picocells. Generally, to avoid cross-talk (overlap) between adjacent combined picocells 40C, different frequencies are used for adjacent combined picocells, while a common frequency is used within each combined picocell. Adjacent combined picocells 40C are nevertheless shown as overlapping in FIG. 20 for ease of illustration.

It is worth noting again that in an example embodiment the size of combined picocells 40C is adjustable by adjusting the power to antenna systems 100. This is illustrated in FIG. 20 by the combined picocell 40C having the large-dash line type and located to the center-right in the picocellular coverage area 44.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A centralized optical-fiber-based wireless picocellular system for wirelessly communicating with at least one client device, comprising:
   a central head-end station adapted to provide radio-frequency (RF) signals;
   two or more transponders optically coupled to the central head-end station via one or more optical fiber RF communication links, with the two or more transponders adapted to convert electrical signals to optical signals and vice versa and having an antenna system that forms a corresponding picocell based on said RF signals, wherein adjacent picocells formed from RF signals having different frequencies do not substantially overlap; and
   wherein the central head-end station is adapted to provide one or more groups of two or more transponders with said RF signals having a common frequency within the transponder group so as to form corresponding one or more combined picocells.

2. The system of claim 1, wherein the central head-end unit includes a diversity selector adapted to provide antenna diversity to at least one of the one or more combined picocells.

3. The system of claim 1, wherein the central head-end unit is adapted to provide phases to the common-frequency RF signals provided to at least one of the one or more combined picocells so that the antenna systems of the transponders in the transponder group of the at least one combined picocell operate as a phased-array antenna network.

4. The system of claim 1, wherein:
   one or more of the at least one client devices and the central head-end station are adapted to perform multiple-input/multiple-output (MIMO) processing of the RF signals.

5. The system of claim 4, wherein the central head-end station includes a service unit with MIMO signal processing capability.

6. The system of claim 5, wherein the service unit includes a MIMO chip adapted to perform said MIMO signal processing.

7. In a centralized optical-fiber-based wireless picocellular system having a central head-end station, a method of combining two or more picocells that are substantially non-overlapping when operated at different radio-frequency (RF) frequencies, comprising:
   operating a group of two or more neighboring picocells at a common RF frequency provided by the central head-end station to provide substantial overlap of said two or more neighboring picocells so as to form a combined picocell.

8. The method of claim 7, including forming one or more additional groups of two or more neighboring picocells at other common frequencies so as to form multiple combined picocells.

9. The method of claim 8, wherein neighboring combined picocells operate at a different common frequency.

10. The method of claim 7, wherein a client device resides within the combined picocell and wherein the picocell has an associated transponder with an antenna system, the method further including:
   communicating between the client device and the central head-end station using antenna diversity via the transponder antenna systems associated with the combined picocell.

11. The method of claim 7, wherein a client device resides within the combined picocell and wherein the picocell has an associated transponder with an antenna system, the method further including:
   communicating between the client device and the central head-end station by operating the transponder antenna systems associated with the combined picocell as a phased-array antenna network.

12. The method of claim 7, wherein a client device having multiple antennas and adapted to communicate using multiple-input/multiple-output (MEMO) signal processing resides within the combined picocell and wherein the picocell has an associated transponder with an antenna system, the method further including:
   communicating between the client device and the central head-end station using MIMO signal processing via the client device multiple antennas and the transponder antenna systems associated with the combined picocell.

13. A method of forming a combined picocell in a wireless picocellular system adapted to form individual picocells that do not substantially overlap when operated at different frequencies, with the individual picocells associated with a transponder optically coupled to a central head-end station and having an antenna system, the method comprising:
   a) providing at the central head-end station a downlink radio-frequency (RF) signal; and
   b) either simultaneously or non-simultaneously sending the downlink RF signal to corresponding two or more neighboring transponders at a common frequency so that said two or more neighboring transponders substantially overlap to form a combined picocell.

14. The method of claim 13, including performing acts a) and b) for different common frequencies and for different two or more neighboring transponders so as to form multiple combined picocells.

15. The method of claim 13, wherein a client device resides within the combined picocell and wherein the antenna has an associated received signal strength as measured at the central head-end station, the method further including:
   communicating between the client device and the central head-end station using antenna diversity via the transponder antenna systems associated with the combined picocell by having the central head-end station communicate with the transponder having the greatest received signal strength.

16. The method of claim 15, including operably providing the central head-end station with a diversity selector.

17. The method of claim 13, wherein a client device resides within the combined picocell, and further including:
   communicating between the client device and the central head-end station by operating the transponder antenna systems associated with the combined picocell as a phased-array antenna network.

18. The method of claim 13, wherein a client device having multiple antennas and adapted to communicate using multiple-input/multiple-output (MIMO) signal processing resides within the combined picocell, and further including:
   communicating between the client device and the central head-end station using MIMO signal processing via the client device multiple antennas and the transponder antenna systems associated with the combined picocell.

19. The method of claim 18, including operably providing the central head-end station with a MIMO chip adapted to perform said MIMO signal processing.

20. The method of claim 19, including operating the MIMO chip to cause the downlink RF signal to be divided into multiple bit streams and providing the multiple bit streams to corresponding multiple transponder antenna systems associated with the combined picocell.

* * * * *